United States Patent [19]

Watanabe

[11] Patent Number: 5,142,567
[45] Date of Patent: Aug. 25, 1992

[54] COMMUNICATION APPARATUS HAVING ALTERNATE MESSAGE COMMUNICATION

[75] Inventor: Mitsuhiro Watanabe, Yokohama, Japan

[73] Assignee: Canon Kabushiki Kaisha, Tokyo, Japan

[21] Appl. No.: 647,205

[22] Filed: Jan. 28, 1991

Related U.S. Application Data

[63] Continuation of Ser. No. 347,064, May 4, 1989, abandoned.

[30] Foreign Application Priority Data

| May 9, 1988 [JP] | Japan | 63-113281 |
| May 11, 1988 [JP] | Japan | 63-112520 |
| May 11, 1988 [JP] | Japan | 63-112521 |

[51] Int. Cl.⁵ .......................... H04M 11/00
[52] U.S. Cl. ............................ 379/100; 379/156
[58] Field of Search ............ 379/100, 96–98, 379/94, 156, 146

[56] References Cited

U.S. PATENT DOCUMENTS

| 4,321,429 | 3/1982 | Takatsuki et al. | 379/98 |
| 4,345,113 | 8/1982 | Shelley | 379/102 |
| 4,353,097 | 10/1982 | Takeda et al. | 379/100 |
| 4,487,504 | 12/1984 | Nakano et al. | |
| 4,502,080 | 2/1985 | Tsuda | 379/100 |
| 4,564,724 | 1/1986 | Nakayama et al. | 379/100 |
| 4,596,021 | 6/1986 | Carter et al. | 379/98 |
| 4,640,988 | 2/1987 | Robinton | 379/90 |
| 4,660,218 | 4/1987 | Hashimoto | 379/100 |
| 4,663,778 | 5/1987 | Takahashi | 379/100 |
| 4,677,660 | 6/1987 | Yoshide | |
| 4,800,439 | 1/1989 | Yoshino | |
| 4,809,317 | 2/1989 | Howe et al. | 379/98 |
| 4,815,121 | 3/1989 | Yoshida | |
| 4,821,312 | 4/1989 | Horton et al. | 379/100 |
| 4,852,153 | 7/1989 | Streck | 379/100 |
| 4,868,865 | 9/1989 | Ogawa et al. | 379/100 |
| 4,901,343 | 2/1990 | Yamaguchi | 379/100 |

FOREIGN PATENT DOCUMENTS

| 0046567 | 3/1982 | Japan | 379/94 |
| 62-298298 | 12/1987 | Japan | 379/100 |
| 0148750 | 6/1988 | Japan | 379/100 |
| 63-174464 | 7/1988 | Japan | 379/100 |
| 2183427 | 6/1987 | United Kingdom | 379/105 |

*Primary Examiner*—James L. Dwyer
*Assistant Examiner*—Wing F. Chan
*Attorney, Agent, or Firm*—Fitzpatrick, Cella, Harper & Scinto

[57] ABSTRACT

A message communication apparatus includes a connection unit, including a DC loop forming circuit, a DC loop detection circuit, and relays, for connecting a data communication apparatus through a connection line, a message communication unit, including a message circuit and a handset, for performing message communication without being through the data communication apparatus, a requesting unit, including a hook switch, for requesting a connection between a communication line and the message communication unit, an IR sending circuit for generating a ringing signal to the data communication apparatus upon detection of an incoming call, and a control circuit for connecting the communication line and the data communication apparatus upon detection of the incoming call when the requesting unit does not output a connection request.

51 Claims, 14 Drawing Sheets

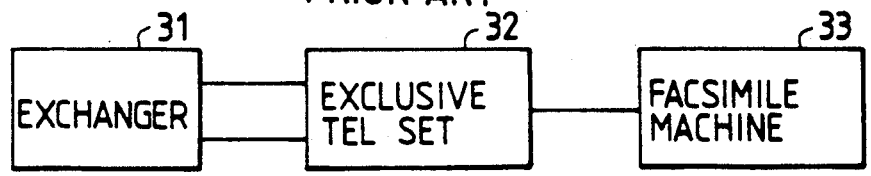
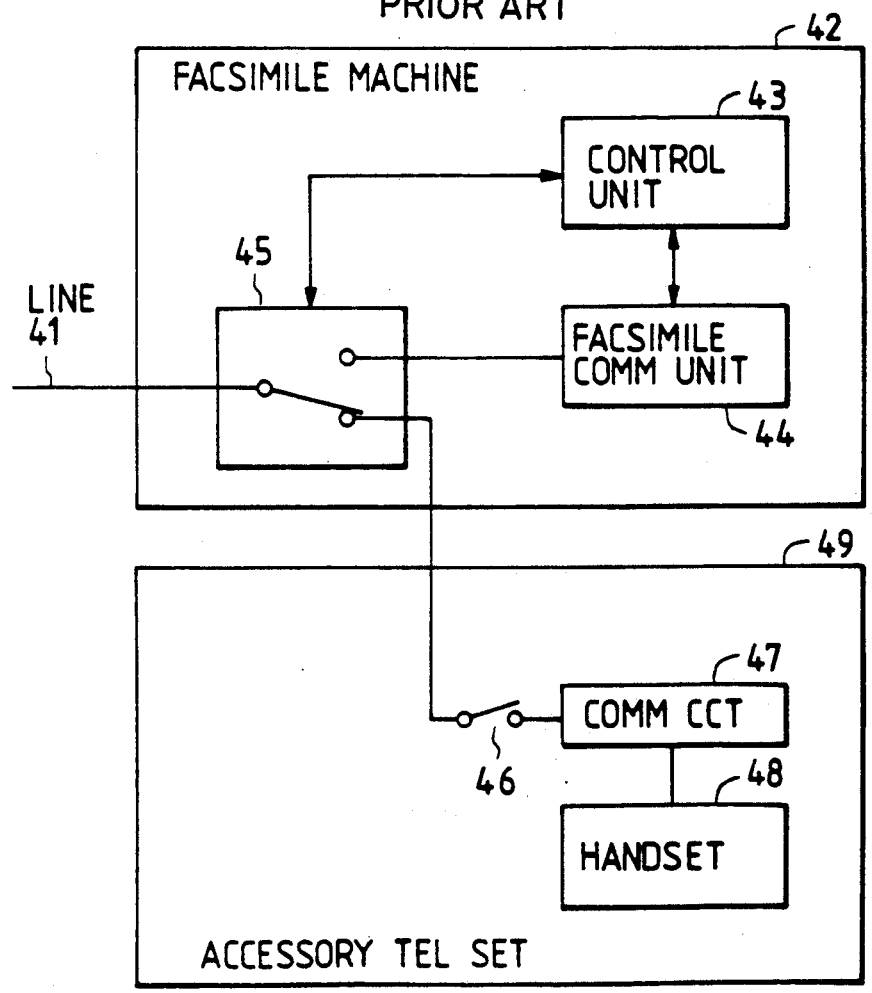

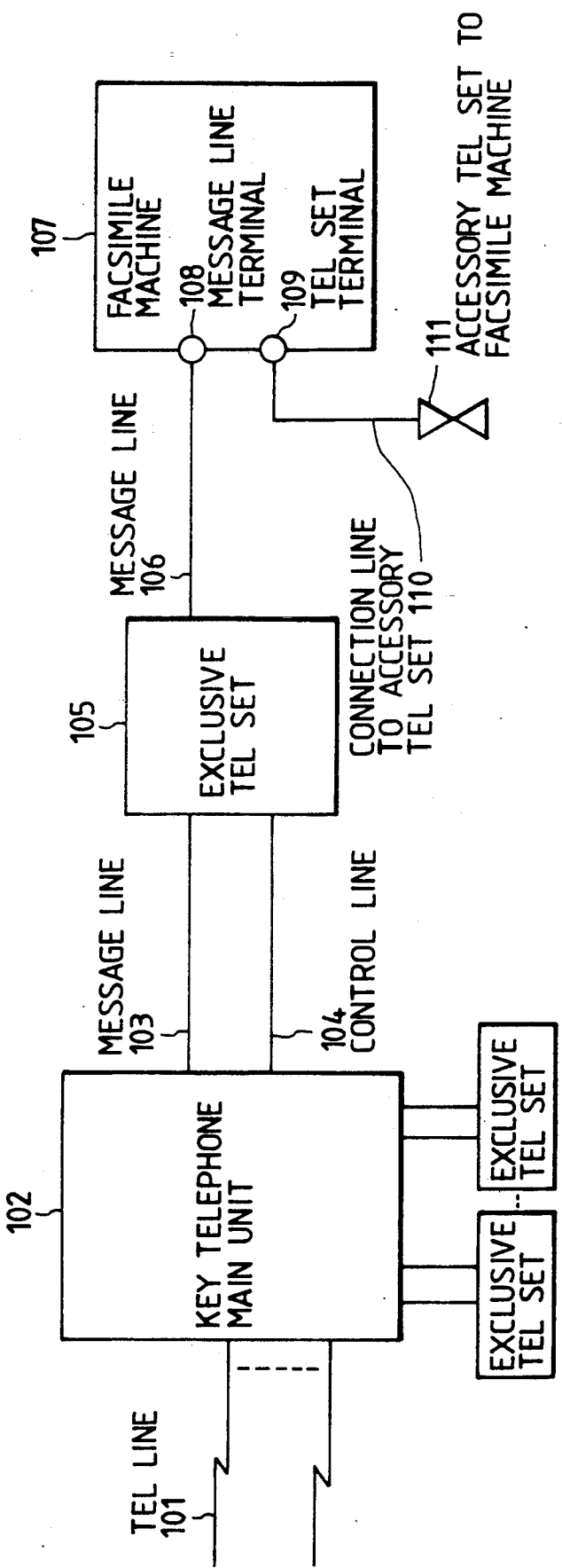

COMMUNICATION APPARATUS HAVING ALTERNATE MESSAGE COMMUNICATION

This application is a continuation of application Ser. No. 07/347,064, filed May 4, 1989, now abandoned.

BACKGROUND OF THE INVENTION:

I. Field of the Invention

The present invention relates to a communication apparatus which can be connected to another communication apparatus.

A key telephone system (to be referred to as a KTS hereinafter) is known as a small PBX system. This KTS comprises a main unit often connected to a network through a plurality of lines, and a plurality of exclusive telephone sets (key telephone sets) connected to the main unit through message and control lines. Each exclusive telephone set includes a connection control key, a hold key, and the like. When message communication is required, the connection control key arranged on each exclusive telephone is depressed to connect this telephone set to the line.

Another conventional apparatus for performing data communication through analog modulation/demodulation, such as a facsimile machine, is known as an apparatus utilizing a telephone line in addition to a speech terminal such as a telephone set. When this data communication apparatus is connected to the KTS, a system may be proposed wherein the apparatus is connected as one of the exclusive telephone sets.

In this system, when the data communication apparatus is set in an automatic incoming call reception mode, the data communication apparatus automatically starts data communication upon detection of a ringing signal. Another system may be proposed wherein the right of reception of an incoming call is assigned to the data communication apparatus upon an operation at a console unit of a main unit or exclusive telephone set to perform automatic incoming call reception, or a priority of reception of the incoming call is assigned to the telephone set, and reception of the incoming call is changed over. Even if the right of reception of the incoming call is controlled as described above, all incoming calls are undesirably received by the data communication apparatus in the automatic incoming call reception mode.

Japanese Patent Publication No. 62-16595 describes an arrangement in which a KTS exclusive telephone set is connected to a data communication apparatus such as a facsimile machine, and the telephone set is used as an adapter of the data communication apparatus. The arrangement of this system is shown in FIG. 1.

In the system described in Japanese Patent Publication No. 62-16595, when a telephone set 32 receives data representing a request for connecting an exchanger 31 to a facsimile machine 33, the telephone set 32 transmits a start signal to the facsimile machine 33. In this case, a message cannot be sent from the telephone set.

A data communication apparatus performs different operations in accordance with whether the data communication apparatus is connected to the line. For example, when a facsimile machine is connected to a line, facsimile communication is performed. However, when the facsimile machine is not connected to the line, the facsimile machine copies an original. For example, in an arrangement shown in FIG. 2, an accessory telephone set 49 and a line 41 are connected to each other through a facsimile machine 42. A control unit 43 in the facsimile machine 42 can cause a switch 45 to detect whether the accessory telephone set 49 is connected to the line 41.

To the contrary, in the system shown in FIG. 1, the exclusive telephone set 32 is connected to the exchanger 31 without being through the facsimile machine 33. Therefore, the facsimile machine 33 cannot detect a connecting state between the telephone set 32 and the exchanger 31.

SUMMARY OF THE INVENTION

It is an object of the present invention to improve a communication apparatus which can connect another communication apparatus in consideration of the above situation.

It is another object of the present invention to allow a response by either of a message communication apparatus and a data communication apparatus upon detection of an incoming command It is still another object of the present invention to call a communication apparatus and cause it to respond to an incoming call when a message communication apparatus does not respond to the incoming call.

It is still another object of the present invention to call a communication apparatus and cause it to respond to an incoming call when a response from a message communication apparatus is waited for a predetermined period of time upon reception of the incoming call and the message communication apparatus does not respond to the incoming call.

It is still another object of the present invention to operate a data communication apparatus in accordance with a state of a message communication apparatus without being through the data communication apparatus.

It is still another object of the present invention to improve operability of a message communication apparatus connected to a data communication apparatus.

It is still another object of the present invention to normally operate a data communication apparatus connected to a message communication apparatus.

It is still another object of the present invention to provide a message communication apparatus for detecting a connection request output from a data communication apparatus to perform line connection.

It is still another object of the present invention to cause a message communication apparatus for performing message communication without being through a data communication apparatus during data communication of the data communication apparatus.

It is still another object of the present invention to change over the line to a message communication apparatus for performing message communication without disconnecting or breaking the line and without being through a data communication apparatus during data communication of the data communication apparatus.

The above and other objects, features, and advantages of the present invention will be apparent from the detailed description of preferred embodiments in conjunction with the accompanying drawings.

BRIEF DESCRIPTION OF THE DRAWINGS

FIG. 1 is a block diagram showing a communication system in which a facsimile machine is connected to an exclusive telephone set;

FIG. 2 is a block diagram of a facsimile machine having an attached telephone set;

FIG. 3 is a block diagram of a communication system according to a first embodiment of the present invention;

Figure 4:
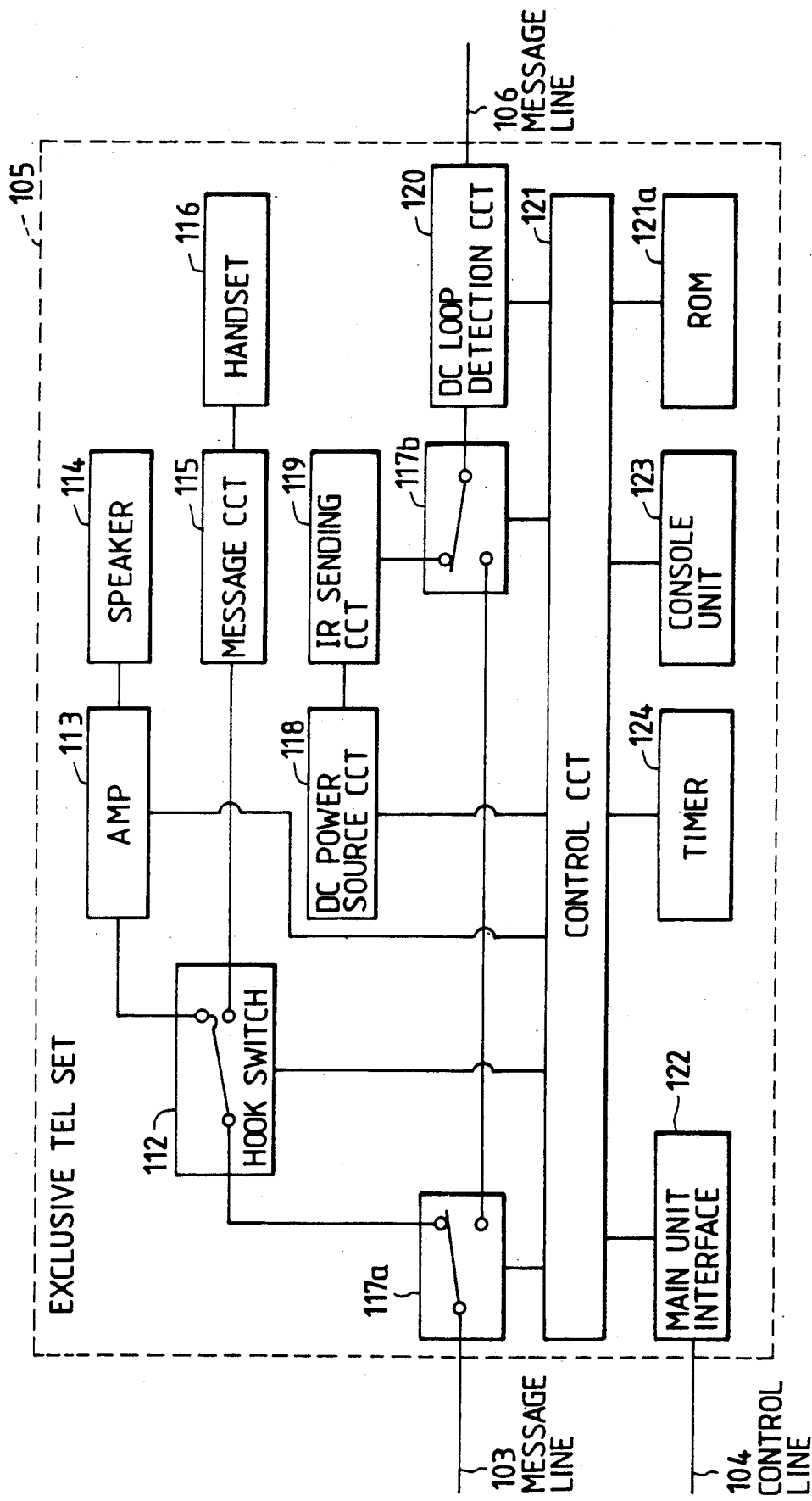
FIG. 4 is a block diagram of an exclusive telephone set of the first embodiment.

DETAILED DESCRIPTION OF THE PREFERRED EMBODIMENTS:

First Embodiment

FIG. 3 shows an arrangement of a key telephone system which employs the present invention. Referring to FIG. 3, a telephone line 101 is connected to a key telephone (KTS) main unit 102. The key telephone main unit 102 is connected to an exclusive telephone set 105 having a facsimile adapter function through four wires. Two of the four wires are used as a message line 103, and the remaining two wires are used as a control line 104 used for controlling the exclusive telephone set 105. The exclusive telephone set 105 is connected to a message line terminal 108 through a two-wire message line 106. A telephone set terminal 109 of a facsimile machine 107 is connected to a telephone set 111 attached to the facsimile machine through a connection line 110 to the accessory telephone set.

A plurality of exclusive telephone sets are connected to the key telephone main unit 102. Control information in the form of a code (digital data) is exchanged between the main unit 102 and the exclusive telephone set. Control information sent from the main unit 102 to the exclusive telephone set 105 includes an incoming command generated upon reception of an incoming call from the telephone line 101 or another exclusive telephone set. Control information sent from the exclusive telephone set 105 to the main unit 102 includes an off-hook command generated upon an off-hook state of a telephone set. When the main unit 102 detects an incoming call from the telephone line 101, the main unit 102 sends the incoming command to all available exclusive telephone sets.

FIG. 4 is a block diagram of the exclusive telephone set of the first embodiment of the present invention The message line 103 connected to the main unit is selectively connected to a hook switch 112 or a DC loop detection circuit 120 through relays 117a and 117b.

When the exclusive telephone set is used as a normal telephone set, the relay 117a connects the message line 103 connected to the main unit 102 to the hook switch 112. When the hook switch 112 is open, the relay 117a is connected through an amplifier 113 controlled by a control circuit 121 to a speaker 114. When the hook switch 112 is closed, the relay 117a is connected to a handset 116 through a message circuit 115, and message communication can be performed. The OFF/ON information of the hook switch 112 is transmitted to the control circuit 121. In this case, the relay 117b connects a DC power source circuit 118 to the message line 106 connected to the facsimile machine 107, so that the facsimile machine 107 is powered.

The control line 104 from the main unit 102 is connected to a main unit interface 122, and its control information is supplied to the control circuit 121. The control circuit 121 analyzes the control information received from the main unit interface 122. When the control circuit 121 determines that the command received from the main unit 102 is an incoming command, the exclusive telephone set 105 causes an IR (ringing signal) sending circuit 119 to send an IR signal to the message line 10 for the facsimile machine 107 and waits until the facsimile machine 107 forms a DC loop. The DC loop detection circuit 120 detects whether a DC loop is formed on the message line 106 connected to the facsimile machine 107. When the facsimile machine 107 forms a DC loop, the control circuit 121 simultaneously changes over the relays 117a and 117b and connects the message line 103 connected from the main unit 102 to the message line 106 connected to the facsimile machine 107.

A console unit 123 includes dial keys, a one-touch dial key, and function keys. Key depression information is sent to the main unit 102 through the main unit interface 122 under the control of the control circuit 121 The console unit 123 also includes a speaker start/release key (to be referred to as a speaker key hereinafter) and a key (to be referred to an auto receive mode switching key hereinafter) for setting the exclusive telephone set in the facsimile auto receive mode or cancelling this mode.

The auto receive mode switching key is not used to remote-control the receive mode of the facsimile machine 107. That is, the auto receive mode switching key is used to select priority reception by the facsimile machine 107 or incoming call reception for message communication with the exclusive telephone set 105. When the mode switching key is kept on, the exclusive telephone set 105 generates an IR signal to call the facsimile machine 107.

Figure 5:
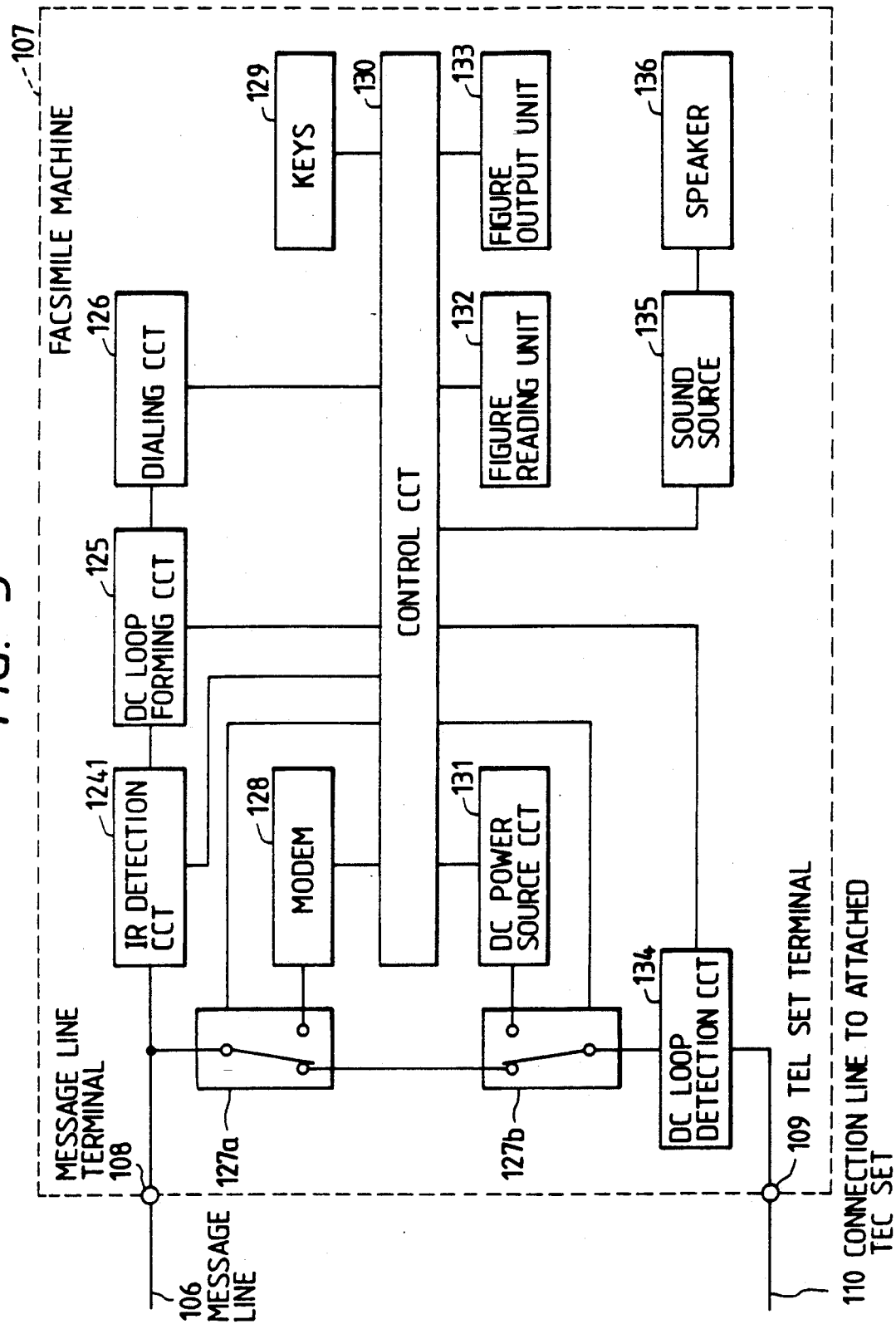
FIG. 5 is a block diagram of a facsimile machine of the first embodiment.

FIG. 5 is a block diagram showing a circuit arrangement of the facsimile machine 107. The message line terminal 108 connected to the message line 106 is connected to the telephone set terminal 109 through relays 127a and 127b. The telephone set 111 attached to the facsimile machine 107 is connected to the telephone set terminal 109. When the telephone set 111 is set in an off-hook state, a DC loop is formed on the connection line 110, and message communication can be performed through the message line 106. A DC loop detection circuit 134 detects whether a DC loop is formed on the connection line 110 attached to the telephone set. A detection signal from the DC loop detection circuit 134 is supplied to a control circuit 130. An IR detection circuit 1241 detects an IR signal on the message line 106. In the auto receive mode of the facsimile machine 107, when the control circuit 130 detects the IR signal, the control circuit 130 causes a DC loop forming circuit 125 to form a DC loop. Furthermore, the relay 127a is changed over to a modem 128, thereby performing facsimile communication Keys 129 connected to the control circuit 130 include a start key, a stop key, 10 numerical keys, a one-touch dial key, and function keys A DC power source circuit 131 detects a DC current for detecting a DC loop on the connection line 110 attached to the telephone set. A figure reading unit 132 and a figure output unit 133 are used to read and output a figure. A sound source 135 and a speaker 136 are used to generate an alarm sound or the like. A dialing circuit 26 outputs a dial tone or a dial pulse to the message line 106 under the control of the control circuit 130.

An operation of the above arrangement will be described below.

Figure 6:
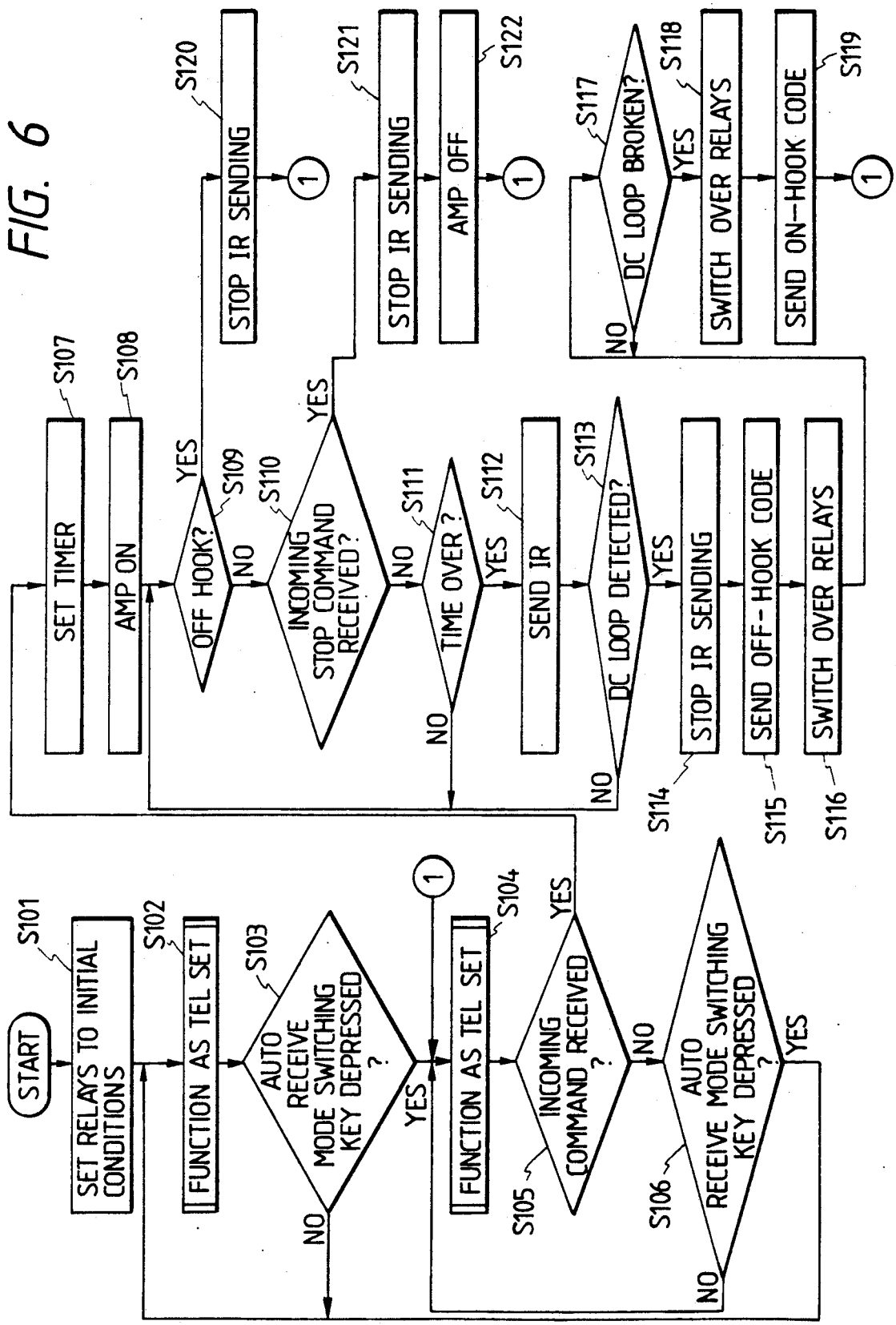
FIG. 6 is a flow chart showing control procedures of the exclusive telephone set of the first embodiment.

FIG. 6 shows control procedures of the exclusive telephone set 105. The procedures in FIG. 6 are stored as a program of the control circuit 121 in a ROM 121a. The same numerals denote the same connectors In the procedures in FIG. 6, the facsimile machine 107 is set in the auto receive mode by the keys 129

In step S101 of FIG. 6, the control circuit 121 performs reset operations In this case, the relays 117a and 117b are reset to the initial conditions, as shown in FIG. 4. More specifically, the relay 117a is changed over to the hook switch 112, and the relay 117b is changed over to the DC power source circuit 118.

The flow then advances to steps S102 and S103. Normal processing of the exclusive telephone set is performed until the auto receive mode switching key in the console unit 123 is depressed. When the handset 116 is set in an off-hook state, an off-hook code is sent to the main unit 102, and a message communication state is set in step S102. Alternatively, upon depression of the speaker key, a speaker reception code is sent to the main unit 102 to set a speaker receive mode in step 102.

Upon depression of the auto receive mode switching key included in the console unit 123 in the exclusive telephone set 105, the exclusive telephone set 105 is set in the auto receive mode. A loop of steps S104, S105, and S106 is executed. In this loop, normal processing of the exclusive telephone set is performed in step 104 in the same manner as in step S102. The flow advances to step S105 to determine whether an incoming command from the main unit 102 is received If NO in step S105, the flow advances to step S106 to determine whether the auto receive switching key is depressed. If YES in step S106, the auto receive mode is released, and the flow returns to the loop of steps S102 and S103.

Upon reception of an incoming call, the main unit 102 sends an incoming command to the exclusive telephone set 105 and other extension telephone sets and further sends a ringing tone thereto through the message line. The control circuit 121 analyzes the command received from the main unit in the loop (auto receive mode) of steps S104, S105, and S106. The flow advances to the operations from step S107 upon decision of reception of an incoming command in step S105 In step S107, a timer 124 is set. In step S108, the amplifier 113 is turned on. The flow then advances to a loop of steps S109, S110, and S111. In step S111, this loop is repeated until the time of the timer 124 has elapsed During this timer period, the control circuit 121 outputs the ringing tone from the message line 103 to the speaker 114. In this loop, when an off-hook operation such as off-hook of the handset 116 or depression of the speaker key is performed, the amplifier is turned off upon decision of step S109. The flow then returns to the loop of steps S104, S105, and S106. The telephone function is executed in step S104 to set a message communication state or a speaker reception state.

When the incoming call is stopped or responded by another exclusive telephone set, the main unit 102 sends an incoming call reception stop command to the nonresponded exclusive telephone sets and stops sending the ringing tone When the control circuit 121 detects that the main unit 102 sent the incoming call reception stop command before the off-hook operation is performed, the control circuit 121 stops operating the amplifier 113 in step S122. The flow then returns to the loop of steps S104, S105, and S106.

When time-out is detected in step S111, i.e., when the telephone set or the exclusive telephone set 105 does not respond to the incoming call by an off-hook operation within a predetermined period of time, the IR sending circuit 119 starts sending the IR signal to the facsimile machine 107 in step S112. The flow advances to steps S109, S110, S111, S112, and S113. When the control circuit 121 detects the off-hook operation of the exclusive telephone set 105 in step S109, the control circuit 121 stops sending the IR signal to the facsimile machine 107 and disables the amplifier 113 in step S120. The flow returns to the loop of steps S104, S105, and S106 However, when the control circuit 121 detects reception of the incoming call reception stop command from the main unit 102 in step S110, the control circuit 121 stops sending the IR signal in step S121 and disables the amplifier 113 in step S122. The flow then returns to the loop of steps S104, S105, and S106. The control circuit 121 determines in step S113 whether the facsimile machine 107 has formed a DC loop on the message line 106, i.e., whether the facsimile machine 107 has responded to the IR signal When the facsimile machine 107 is preset in the auto receive mode, the facsimile machine 107 responds to the IR signal sent from the exclusive telephone set 105 and starts a facsimile auto receive operation More specifically, when the control circuit 130 in the facsimile machine 107 causes the IR detection circuit 124 to detect the IR signal appearing on the message line 106, the DC loop forming circuit 125 forms a DC loop. Furthermore, the relay 127a is changed over to the modem 128, and facsimile communication is started. Since the exclusive telephone set 105 can cause the DC loop detection circuit 120 to detect formation of the DC loop, the operations after step S114 are performed upon decision of step S113.

The control circuit 121 stops sending the IR signal and disables the amplifier 113 in step S114. In step S115, the control circuit 121 transmits an off-hook code to the main unit 102. In step S116, the control circuit 121 changes over the two relays 117a and 117b, and the message line 103 connected from the main unit 102 is connected to the message line 106 connected to the facsimile machine 107. The flow then advances to the loop of step S117.

When the main unit 102 receives the off-hook code, the main unit 102 connects the message line 103 to the calling end. Therefore, the facsimile machine 107 can communicate with the calling end through the exclusive telephone set 105. The loop of step S117 continues until the facsimile machine 107 breaks the DC loop of the DC loop forming circuit 125 and facsimile communication is ended. When the facsimile communication is ended, the two relays 117a and 117b are reset to the initial conditions in step S118. The on-hook code is transmitted to the main unit 102 in step S119. The flow returns to the loop of steps S104, S105, and S106.

According to this embodiment, the response of the exclusive telephone set 105 (or another telephone set connected to the main unit 102) is waited for a predetermined period of time When these telephone sets do not respond to the incoming call, the IR signal is sent to the facsimile machine 107 Therefore, the facsimile machine can perform the auto receive operation, and an opportunity for responding to the incoming call is given to the exclusive telephone set 105 or any other extension telephone set within a predetermined period of time before the facsimile machine 107 is set in the auto receive mode.

Furthermore, the facsimile machine 107 can be constituted by any apparatus if it can be set in the auto incoming call reception mode upon reception of an IR signal The present invention does not have limitations as to systems to be employed As described above, the telephone response is detected for the predetermined period of time Even after the facsimile machine 107 is called, the flow returns from step S113 to step S109 of FIG. 6, and a response from the handset 116 can be allowed in step S109. Therefore, a telephone set can respond within a period of time, e.g., 5 to 6 seconds, until the facsimile machine 107 responds to form a DC loop after the predetermined period of time.

Second Embodiment

Figure 7:
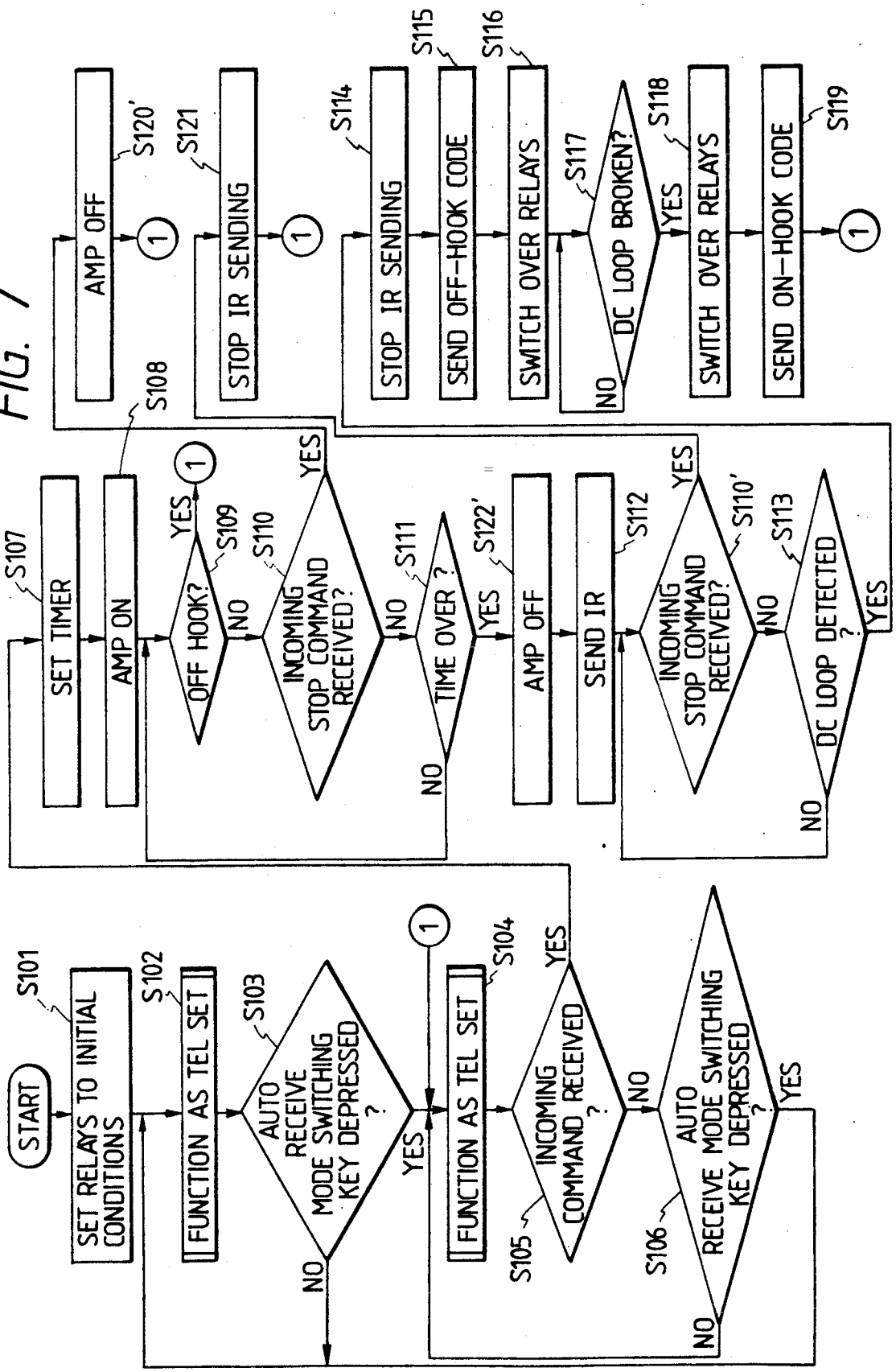
FIG. 7 is a flow chart showing control procedures of an exclusive telephone set according to a second embodiment.

A second embodiment exemplifies an operation for immediately performing facsimile communication upon detection of nonresponse of a telephone set for a predetermined period of time and for inhibiting the telephone response. The control procedures are shown in FIG. 7. FIG. 7 shows the control procedures of an exclusive telephone set 105 as in FIG. 6.

An arrangement of the second embodiment is the same as that of the first embodiment shown in FIGS. 3 to 5.

The flow chart of FIG. 7 is substantially the same as that of FIG. 6 except for steps S109 to S113. Only the differences between FIGS. 6 and 7 will be mainly described below A control circuit 121 receives an incoming command from a main unit 102 in step S105. The operations in steps S107 and S108 are performed in the same manner as in FIG. 6. In steps S109 to S111, an off-hook state, an incoming call reception stop command, and time-out of the predetermined period of time are detected.

When an incoming call is stopped, an amplifier 113 is immediately disabled in step S120' to stop generating the ringing tone.

When the time-out of the predetermined period of time is detected, the control circuit 121 disables the amplifier 113, i.e., stops generating the ringing tone in step S122'. The flow advances to step S112. The control circuit 121 sends an IR signal to a facsimile machine 107 in step S112. That is, telephone ringing and response detection operations are stopped.

In step S110', the control circuit 121 detects an incoming call reception stop command from the main unit 102. When this command is detected, the control circuit 121 stops outputting an IR signal in step S121. When the control circuit 121 detects a DC loop of a message line 106 upon response of the facsimile machine in step S113, facsimile communication is performed in operations from step S114 as in FIG. 6.

The right of reception of an incoming call is given to the telephone set for a predetermined period of time as in the first embodiment, and the right of reception of the incoming call is then given to the facsimile machine. However, in this case, when the telephone set does not respond to the incoming call within the predetermined period of time, facsimile communication can be immediately initiated, and the received original image can be accessed at high speed. Alternatively, the original can be transmitted at high speed (e.g., during polling).

When the auto receive switching key of an exclusive telephone set 105 is kept off, the control circuit 121 does not perform the incoming control of the facsimile machine 107.

In the second embodiment, the period of time during which the right of reception of the incoming call is given to the telephone set need not be a predetermined value but can be variable. In this case, a slide volume control is arranged in a console unit 123 in the exclusive telephone set 105, and a desired time including zero time is set in a timer 124 upon operation of the slide volume control.

The above embodiment exemplifies a facsimile machine. However, the above arrangement is applicable to other data communication apparatuses such as a word-processor and a personal computer.

As is apparent from the above description, according to each of the first and second embodiments, the key telephone system comprises the key telephone main unit 102, the data communication apparatus 107 of a predetermined system, and the telephone set 105 connected between the main unit 102 and the data communication apparatus 107. When the telephone set 105 detects the incoming command output from the main unit 102, a ringing tone is generated for a predetermined period of time including zero time. The response of the telephone set 105 or any other telephone set connected to the main unit 102 is waited. When a predetermined period of time has elapsed, an IR signal is sent to the data communication apparatus 107, and automatic communication operation of the data communication apparatus 107 is started. Therefore, upon reception of an incoming call, the right of reception of the incoming call is given to the telephone set for the predetermined period of time. Only when the telephone does not respond to the incoming call, data communication is started. Therefore, an incoming operation at an appropriate terminal can be performed without performing cumbersome switching operations.

Third Embodiment

Figure 8:
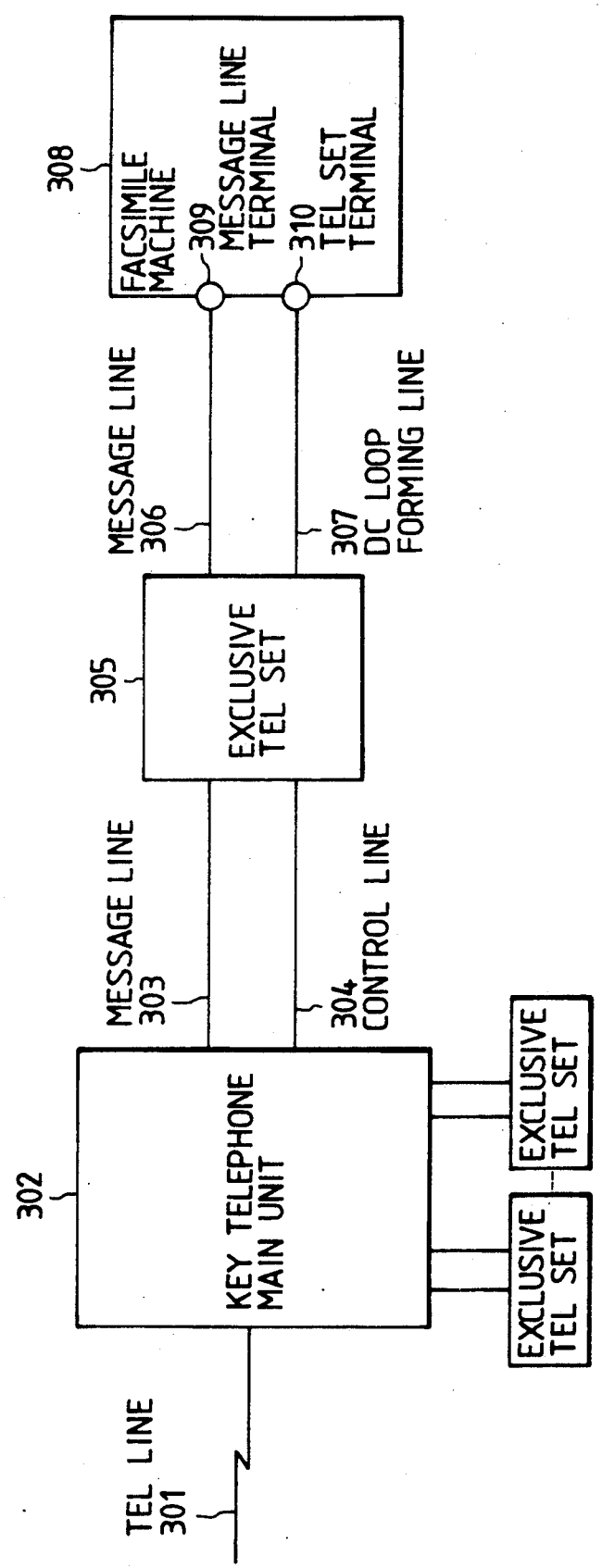
FIG. 8 is a block diagram of a communication system according to a third embodiment of the present invention.

FIG. 8 shows a system configuration of a key telephone system according to a third embodiment of the present invention. A telephone line 301 is connected to a key telephone main unit 302. The main unit 302 has the same arrangement as that of the main unit 102 of FIG. 3 and controls line connections of a plurality of exclusive telephone sets. The key telephone main unit 302 is connected to an exclusive telephone set 305 attached to the facsimile through four wires. Two of the four wires serve as a message line 303 used for message communication. The remaining two wires serve as a control line 304 used for control of the exclusive telephone set. The exclusive telephone set 305 is connected to a facsimile machine 308 through four wires. Two of these four wires serve as a message line 306 connected to a message line terminal 309. The remaining wires serve as a DC loop forming line 307 connected to a telephone set terminal 310.

Figure 9:
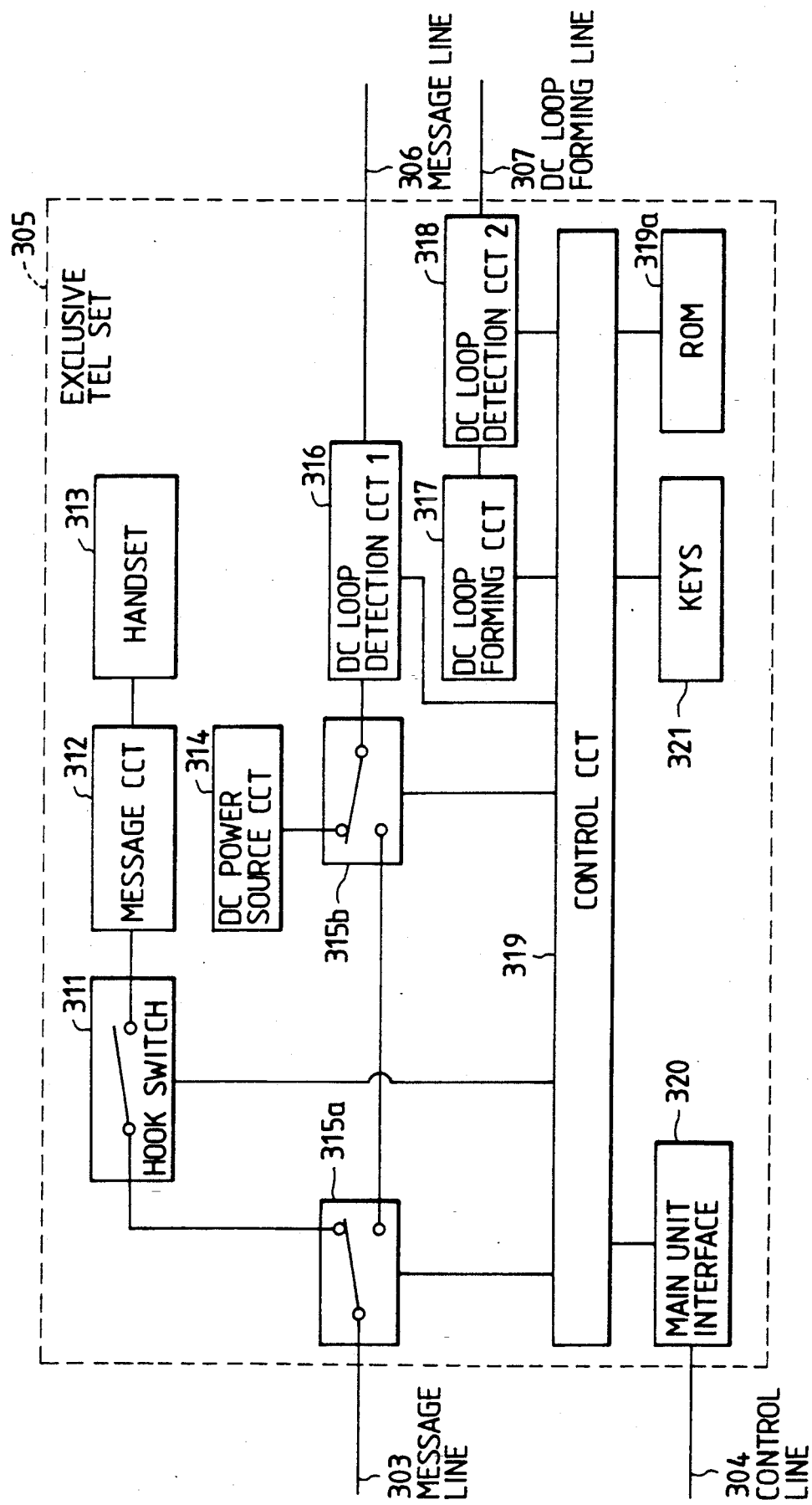
FIG. 9 is a block diagram of an exclusive telephone set of the third embodiment.

FIG. 9 is a block diagram showing an arrangement of the exclusive telephone set 305 attached to the facsimile machine in FIG. 8. The message line 303 connected to the main unit 302 is selectively connected to a hook switch 311 or a DC loop detection circuit 1 (316) through two relays 315a and 315b.

When the exclusive telephone set 305 is used as a normal telephone set, the relay 315a connects the message line 303 to the hook switch 311. When the hook switch 311 is closed, a handset 313 can perform message communication through a message circuit 312. In this case, the relay 315b connects a DC power source circuit 314 to the message line 306 connected to the facsimile machine 308, so that the facsimile machine 308 is powered.

In the facsimile communication mode, a control circuit 319 simultaneously changes over the relays 315a and 315b and connects the message line 303 connected from the main unit 302 to the message line 306 connected to the facsimile machine 308. The DC loop detection circuit 1 (316) detects whether a DC loop 1 is formed on the message line 306 connected to the facsimile machine 308. A detection signal from the DC loop detection circuit 1 (316) is transmitted to the control circuit 319.

ON/OFF information of the hook switch 311 is also supplied to the control circuit 319.

The DC loop forming line 307 connected to the telephone set terminal 310 of the facsimile machine 308 is connected to a DC loop forming circuit 317 through a DC loop detection circuit 2 (318). The DC loop forming circuit 317 forms or breaks a DC loop 2 under the control of the control circuit 319.

The DC loop detection circuit 2 (318) detects whether a DC loop is formed on the DC loop forming line 307. A detection signal from the DC loop detection circuit 2 (318) is supplied to the control circuit 319

The control line 304 connected from the main unit 302 is connected to a math unit interface 320, and information on the control line 304 is supplied to the control circuit 319.

Keys 321 include dial keys, a one-touch dial key, and function keys. Key depression signals from the keys 321 are supplied to the main unit 302 through the main unit interface 320 under the control of the control circuit 319.

Figure 10:
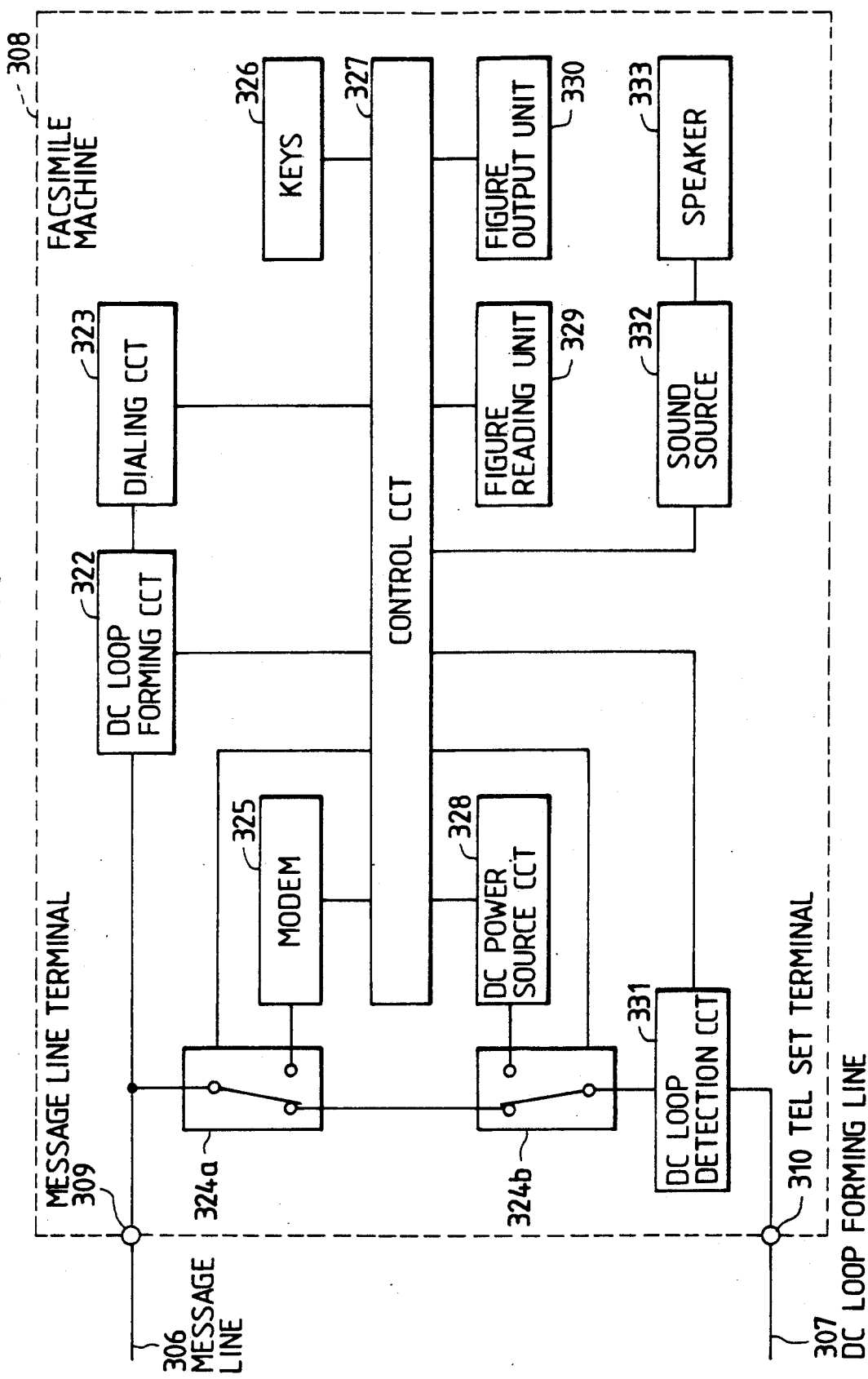
FIG. 10 is a block diagram of a facsimile machine of the third embodiment.

FIG. 10 is a block diagram showing a circuit arrangement of the facsimile machine 308. The message line terminal 309 connected to the message line 306 is connected to the telephone set terminal 310 through two relays 324a and 324b controlled by a control circuit 327.

As in the arrangement shown in FIGS. 2 and 3, when a two-wire telephone set attached to the facsimile machine is connected to the telephone set terminal 310, this telephone set is set in an off-hook state, a DC loop is formed on the DC loop forming line 307, and message communication can be performed through the message line 306. The telephone set attached to the facsimile machine is defined as a two-wire telephone set for performing message communication through the telephone set terminal 310, the relays 324a and 324b, the message line terminal 309, and the message line 306. When facsimile communication is performed, the control circuit 327 causes a DC loop forming circuit 322 to form a DC loop, and the relay 324a is changed over to a modem 325, thereby performing facsimile communication. A DC loop detection circuit 331 detects formation of a DC loop on the DC loop forming line 307, i.e., the off-hook state of the telephone set attached to the facsimile machine. A detection signal from the DC loop detection circuit 331 is supplied to the control circuit 327.

A dialing circuit 323 performs dialing on the basis of a signal from the control circuit 327. Keys 326 include a start key, a stop key, 10 numerical keys, a one-touch dial key, and function keys. A figure reading unit 329 reads a figure and the read figure information is transmitted to the control circuit 327. A figure output unit 330 outputs a figure on the basis of figure information transmitted from the control circuit 327.

Upon depression of the start key, when the DC loop detection circuit 331 detects a DC loop, the control circuit 327 causes the DC loop forming circuit 322 to form a DC loop, and the relay 324a is changed over to the modem 325, thereby starting facsimile communication. However, when the DC loop detection circuit 331 does not detect a DC loop, a figure read by the figure reading unit 329 is output from the figure output unit 330, thereby performing a copying operation.

A DC power source circuit 328 supplies a DC current for detecting a DC loop on the DC loop forming line 307. A sound source 332 and a speaker 333 are used to generate an alarm sound. The dialing circuit 323 outputs a dial tone or pulse to the message line 306 under the control of the control circuit 327.

An operation of the above arrangement will be described below.

Figure 11:
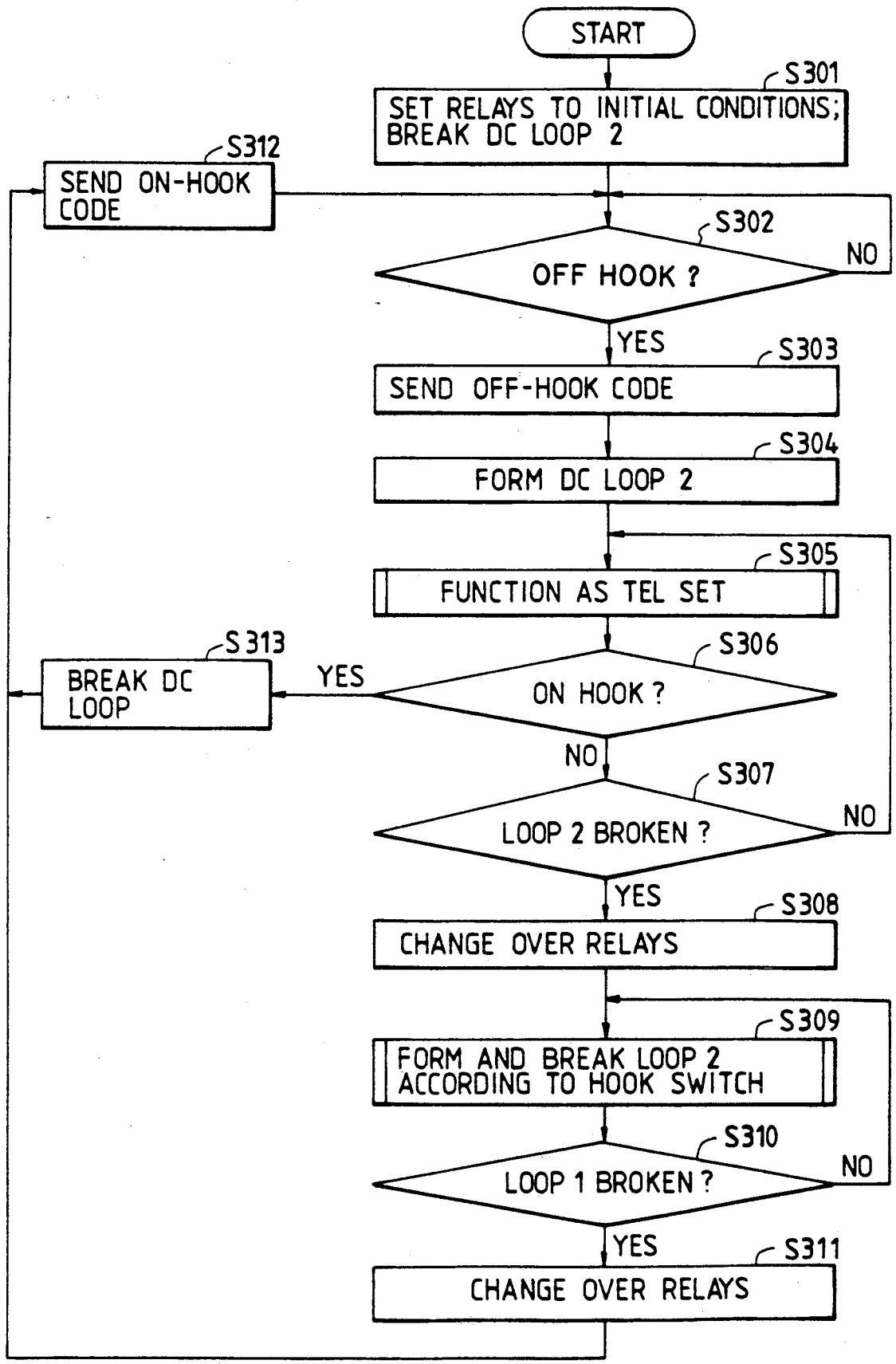
FIG. 11 is a flow chart showing control procedures of the exclusive telephone set of the third embodiment.

FIG. 11 shows control procedures of the exclusive telephone set 305. The procedures of FIG. 11 are stored in a ROM 319a as a program of the control circuit 319.

In step S301 in FIG. 11, the control circuit 319 performs reset operations. More specifically, as shown in FIG. 9, the relays 315a and 315b are set in the initial conditions. That is, the control circuit 319 changes over the relay 315a to the hook switch 311. The relay 315b is changed over to the DC power source circuit 314. At the same time, the control circuit 319 breaks a DC loop 2 of the DC loop forming line 307 which is formed by the DC loop forming circuit 317.

The control circuit 319 monitors the state of the hook switch 311 in step 302. When an off-hook state is set, an off-hook code is transmitted to the main unit 302 through the control line 304 in step S303. The control circuit 319 causes the DC loop forming circuit 317 to form the loop 2 on the DC loop forming line 307 in step S304. This operation is performed as if the two-wire telephone set connected to the telephone set terminal 310 is set in an off-hook state for the facsimile machine 308. The flow then advances to a loop of steps S305, S306, and S307.

The control circuit 319 performs telephone function processing in step S305. When the control circuit 319 detects an on-hook state in step S306, the control circuit 319 breaks the DC loop 2 of the DC loop forming circuit 317 in step S313. In step S312, the control circuit 319 sends an on-hook code to the main unit 302. The flow then returns to step S302.

If the off-hook state is kept unchanged in step S306, the control circuit 319 determines in step S307 whether the DC loop detection circuit 318 detects the DC loop 2. If NO in step S307, the loop of steps S305, S306, and S307 is repeated to continue message communication When facsimile communication (e.g., image transmission) is started during message communication, the start key of the keys 326 in the facsimile machine 308 is depressed, and therefore the relay 324a of the facsimile machine 308 is changed over to the modem 325.

The control circuit 319 determines changeover of the relay 324a in step S307 by checking whether the loop 2 of the DC loop forming line 307 is broken through the DC loop detection circuit 318. When the start key of the facsimile machine 308 is not depressed, the message line 306 is connected to the DC loop forming line 307 by the relays 324a and 324b of the facsimile machine 308. Therefore, the DC loop detection circuit 318 does not detect loop breaking, and message communication continues.

When the start key of the facsimile machine 308 is depressed, the relay 324a is changed over to the modem 325. In this case, the DC loop detection circuit 318 does not detect the DC loop 2, and the flow advances to step S308. In step S308, the control circuit 319 changes over the relays 315a and 315b to connect the message line 303 to the message line 306 for the facsimile machine 308 through the DC loop detection circuit 316. The flow then advances to a loop of steps S309 and S310. In this loop, facsimile communication is performed. A transmission/reception signal passes in a path of the message line 303, the relays 315a and 315b, the DC loop detection circuit 316, the message line 306, and the modem 325.

During facsimile communication, breaking and formation of the DC loop 2 by the DC loop forming circuit 317 are synchronized with opening and closing of the hook switch 311 in step S309. That is, in the off-hook state of the handset 313, the loop 2 on the DC loop forming line 307 is maintained. Upon an on-hook operation, the loop 2 on the DC loop forming line 307 is broken. Therefore, the on- and off-hook operations of the handset 313 serve as the on-hook operation of the telephone set attached to the facsimile machine in the facsimile machine 308.

In step S310, breaking of the loop 1 on the message line 306 is detected through the DC loop detection circuit 316 to determine whether facsimile communication is ended.

If facsimile communication continues, control in step S309 continues due to the following reason. During facsimile communication, the facsimile machine 308 causes the DC loop forming circuit 322 to form the DC loop 1, and the DC loop 1 is detected by the DC loop detection circuit 316. Therefore, the operation of the telephone set attached to the facsimile machine can be perfectly simulated during facsimile communication.

For example, when facsimile communication is started, the handset 313 of the exclusive telephone set 305 is set in the on-hook state and the end of facsimile communication is waited. In this case, the DC loop 2 of the DC loop forming circuit 317 is broken in step S309. This operation serves as if the telephone set attached to the facsimile machine is set in an on-hook state for the facsimile machine 308. This on-hooks state is detected by the DC loop detection circuit 331 in the facsimile machine 308.

When facsimile communication is ended, the control circuit 327 in the facsimile machine 308 changes over the relay 324a to the telephone set terminal 310 and breaks the DC loop 1 of the DC loop forming circuit 322. In this case, the DC loop 2 is not formed on the DC loop forming line 307. Therefore, the DC loop detection circuit 1 (316) does not detect the DC loop 1, and control of the control circuit 319 is shifted from step S310 to step S311. In step S311, the relays 315a and 315b are returned to the initial conditions as in step S301. An on-hook code is sent to the main unit 302 in step S312, and the flow returns to step S302.

As described above, the DC loop detection circuit 318 is connected to the telephone set terminal of the facsimile machine 308. During message communication, the loop of the facsimile machine 308 through the detection circuit 318 is detected to determine whether facsimile communication is started. Therefore, upon depression of the start key of the facsimile machine during message communication, the exclusive telephone set 5 automatically and immediately performs necessary line connection changeover, and facsimile communication can be started without causing the operator to perform cumbersome line control operations.

The loop forming circuit 317 is connected to the telephone set terminal 310 of the facsimile machine 308, and the KTS exclusive telephone set can be operated as a telephone set attached to the facsimile machine during facsimile communication. According to this embodiment, therefore, when the KTS exclusive telephone set 305 is connected between the main unit 302 and the facsimile machine 308, line changeover key operations can be omitted. The facsimile communication can be easily started during message communication In addition, no limitations caused by nonuse of the telephone set attached to the facsimile machine are imposed. For example, there is available a system including the facsimile machine 308 for causing the DC loop detection circuit 331 to detect the on- and off-hook operations of the accessory telephone to change over the copy mode and the facsimile communication mode. In this case, the on- and off-hook operations of the exclusive telephone set 305 are detected to change over the copy and facsimile communication modes.

In this embodiment, the DC loop detection circuit 16 is arranged in the exclusive telephone set 305 to detect the end of facsimile communication of the facsimile machine 308 and breaking of the loop 1. The relay 315a is changed over to the hook switch 311 in response to breaking of the loop 1. According to this embodiment, therefore, the initial condition can be restored without key operations by the operator at the end of facsimile communication.

Fourth Embodiment

In the third embodiment described above, message communication is performed through the handset 313 of the exclusive telephone set 305. However, similar control can be performed in hand-free message communication and speaker message reception.

Figure 12:
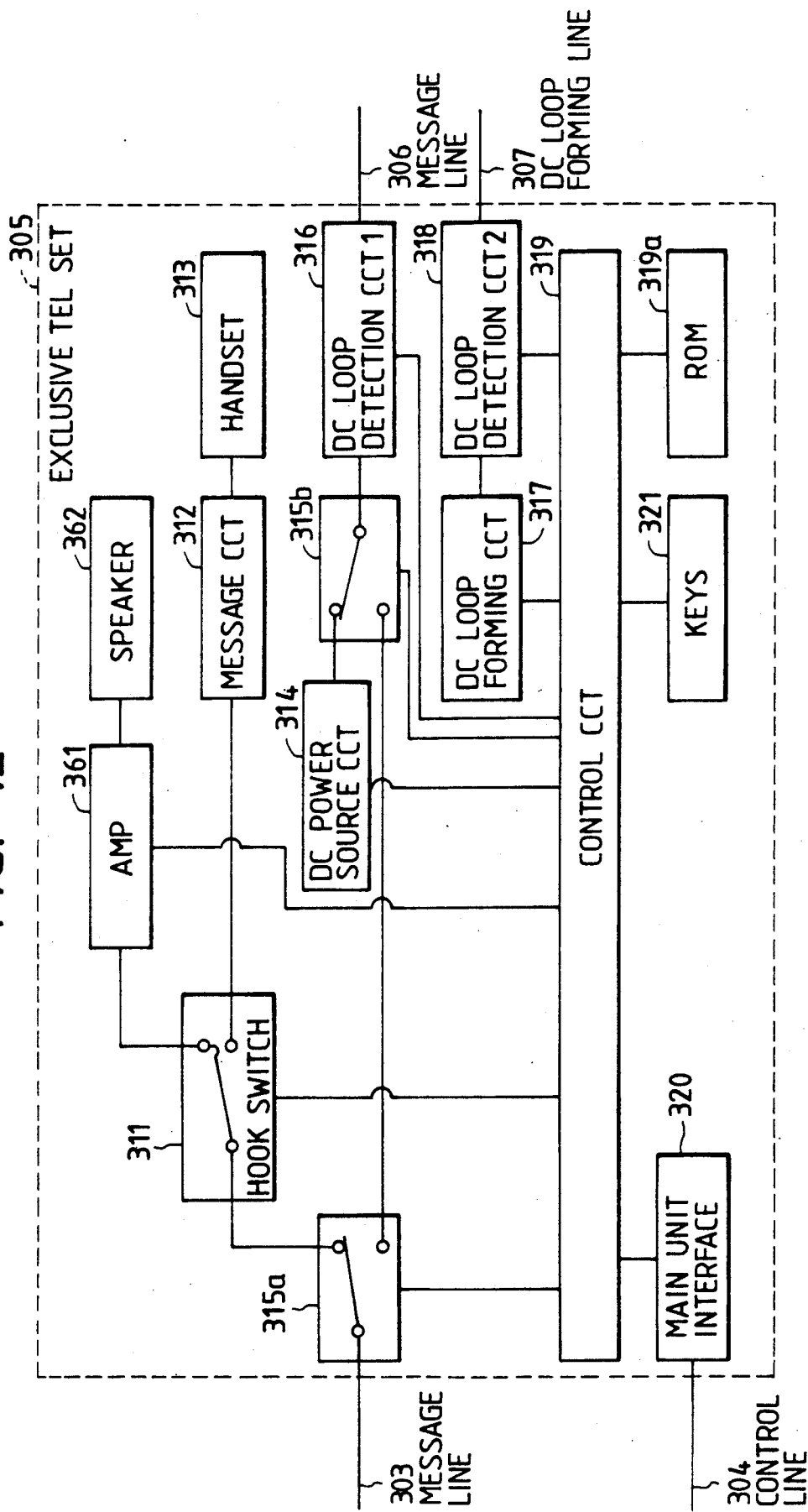
FIG. 12 is a block diagram of an exclusive telephone set according to a fourth embodiment of the present invention.

FIG. 12 shows an arrangement of an exclusive telephone set 305 in which a speaker 362 for speaker message reception is connected to a hook switch 311 through an amplifier 361 according to a fourth embodiment of the present invention. The arrangement except for the amplifier 361 and the speaker 362 is the same as that of the third embodiment.

When the exclusive telephone set 305 is used as a normal telephone set, a relay 315a connects a message line 303 connected to a main unit 302 to the hook switch 311. When the hook switch 311 is open, the speaker 362 is connected through the amplifier 361. When the hook switch 311 is closed, the relay 315a is connected to a handset 313 through a message circuit 312 so that message communication can be performed. During message communication, a relay 315b connects a DC power source circuit 314 to a message line 306 of a facsimile machine 308 When facsimile communication is to be performed, a control circuit 319 simultaneously changes over the relays 315a and 315b to connect the message line 303 connected from the main unit 302 to the message line 306 connected to the facsimile machine 308.

Figure 13:
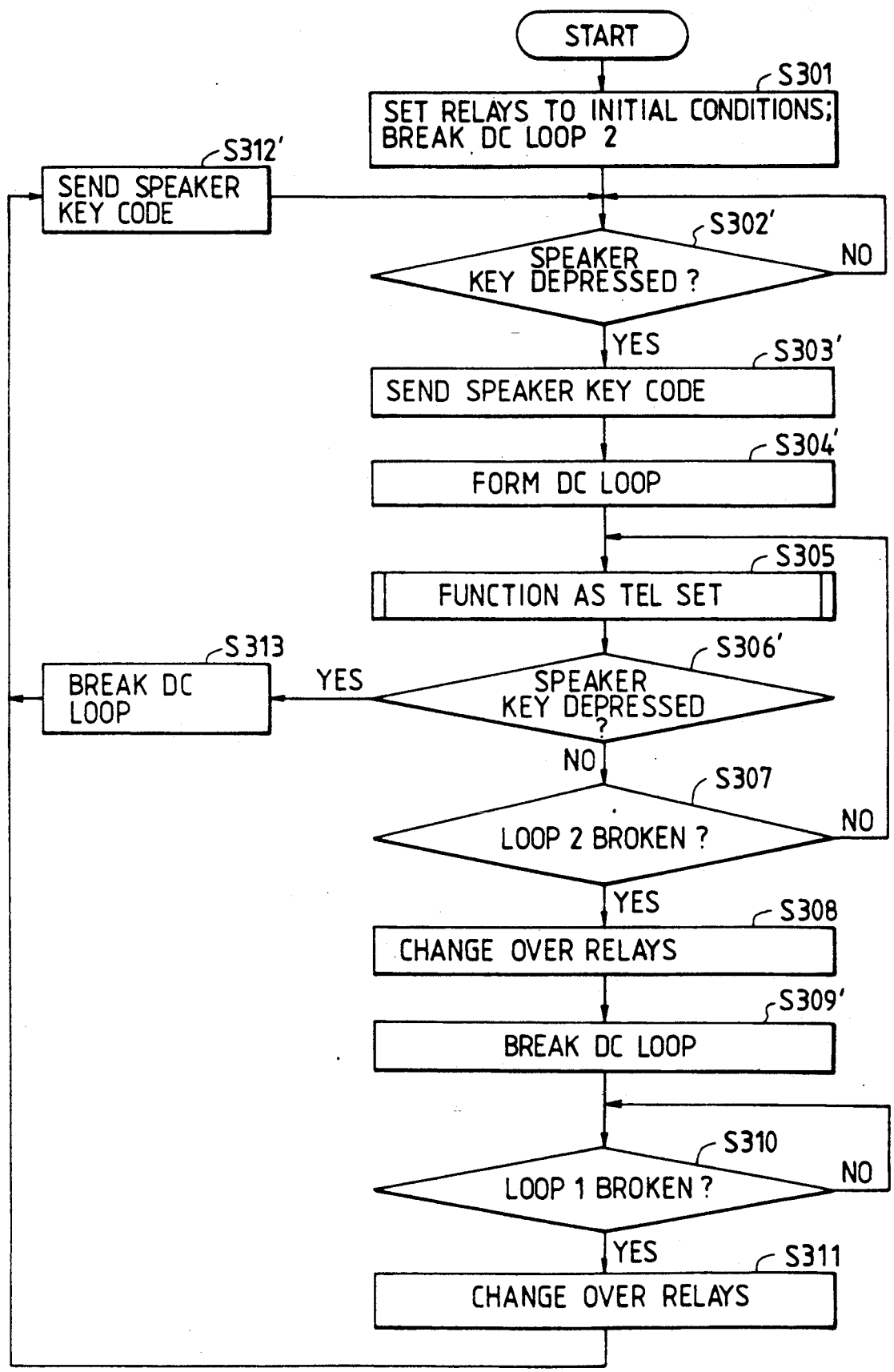
FIG. 13 is a flow chart showing control procedures of an exclusive telephone set according to a fourth embodiment of the present invention.

FIG. 13 shows control procedures of the control circuit 319 in the apparatus shown in FIG. 12. The procedures shown in FIG. 13 are stored in a ROM 319a.

The control procedures in FIG. 13 are substantially the same as those in FIG. 11, except for steps each with a prime, i.e., steps S302', S303', S306', S309', and S312'.

In step S301, the relays 315a and 315b are reset to the initial conditions, as previously described That is, the relay 315a is changed over to the hook switch 311, and the relay 315b is changed over to the DC power source circuit 314 A DC loop 2 on a DC loop forming line 307 is broken.

In step S302, depression of a speaker key (included in keys 321) is detected in place of off-hook detection When an operator wishes message communication by speaker message reception, he depresses the speaker key. In this case, the flow advances to step S303' in the same manner as in the normal off-hook operation.

In step S303', a code representing depression of the speaker key is supplied to the main unit 302 through a control line 304, and the flow advances to step S304.

In step S304, a DC loop is formed on the DC loop forming line 307, and a message communication loop from step S305 is started.

In the message communication loop of steps S305 to S307, control in step S306' is different from that of the third embodiment. Speaker key depression is detected in step S306' in place of on-hook detection. Speaker key depression is processed in the same manner as in the on-hook operation. Upon detection of depression of the speaker key, the flow advances to step S313, the DC loop 2 on the DC loop forming line 307 is broken, and message communication is ended. However, when the speaker key is not depressed, the communication control state of the facsimile machine 308 is detected through the DC loop 2 on the DC loop forming line 307 in step S307.

When the operator depresses the start key in the facsimile machine 308, a control circuit 327 changes over a relay 324a to a modem 325, and the loop 2 on the DC loop forming line 307 is broken. Therefore, the flow advances from step S307 to step S308 upon detection of a DC loop detection circuit 318. Signal path changeover for communication is performed as described above, and the message line 306 is connected to the message line 303. In step S309', formation/breaking of the DC loop on the DC loop forming line 307 is not synchronized with OFF/ON operation of the hook switch. In this case, the DC loop 1 formed by the DC loop forming circuit 317 is unconditionally broken because an operation corresponding to the on-/off-hook state is not performed in speaker message reception.

In step S310, the end of communication of the facsimile machine 308 is waited as described above. When facsimile communication is ended, initialization of the relays 315a and 315b is performed in step S311. A speaker code is output to the main unit 302 in step S312, and the flow returns to step S302.

By the above procedures, line changeover by cumbersome key operations is not required in an apparatus capable of speaker message reception. When the facsimile apparatus is started during message communication, facsimile communication is started.

Different control procedures for use of the handset and speaker message reception have been described above. Similar control procedures can be used in an apparatus having either the handset message reception mode or the speaker message reception mode. In this case, a flag which represents the current message communication mode is set, and an object (i.e., on-/off-hook operation or depression of the speaker key) to be detected is changed over on the basis of the state of the flag.

The above embodiment exemplifies a facsimile machine. However, the present invention is also applicable to other data communication apparatuses such as a wordprocessor and a personal computer to obtain the same effect as in the above embodiment.

According to each of the third and fourth embodiments described above, the DC loop state of the telephone set terminal 310 of the data communication apparatus 308 is controlled in accordance with the message communication state of the telephone set attached to the data communication apparatus. At the same time, the communication control state of the data communication apparatus 308 can be detected by the loop state of the line connected to the telephone set terminal 310. Necessary communication line changeover can be immediately and automatically performed upon starting of data communication.

Fifth Embodiment

A fifth embodiment exemplifies an operation wherein an exclusive telephone set 334 can respond to a telephone reservation of a facsimile machine 308 in a system as in FIG. 8.

A telephone reservation will be described with reference to a block diagram of a facsimile machine shown in FIG. 10.

When a telephone reservation is made on the facsimile communication procedures, a control circuit 327 controls a sound source 332 and changes over a relay 324b to a DC power source circuit 328 while causing a speaker 333 to keep generating a ringing tone. A current is then supplied to a DC loop forming line 307. The control circuit 327 waits until an off-hook state of a telephone set attached to the facsimile machine and connected to a telephone set terminal 310 is detected by a DC loop detection circuit 331. When the operator sets the telephone set attached to the facsimile machine in the off-hook state, the control circuit 327 sends an off-hook signal to a facsimile machine at the other end of the line. The control circuit 327 changes over a relay 324a and the relay 324b to connect a message line 306 to the DC loop forming line 307, and message communication with the telephone set attached to the facsimile machine is enabled. In this case, a DC loop of a DC loop forming circuit 322 is broken. Thereafter, the line is disconnected by an on-hook operation of the telephone set attached to the facsimile machine.

As shown in FIG. 8, when a key telephone exclusive telephone set 305 is connected to the facsimile machine through four wires and is used as a facsimile adapter, a response to the telephone reservation in facsimile communication is preferably performed by an off-hook operation of the handset of the exclusive telephone set 305. For this purpose, formation and breaking of the DC loop of a DC loop forming circuit 317 must be synchronized with on- and off-hook operations of the exclusive telephone set 305. In addition, the exclusive telephone set 305 must detect a telephone reservation. This detection can be performed by causing the exclusive telephone set 305 to monitor the communication procedures of the facsimile machine. The communication procedures need not be monitored. In this case, a DC loop 2 is detected by a DC loop detection circuit 2 (318) while the DC loop detection circuit 1 (316) keeps detecting the DC loop 1 due to the following reason. The above state indicates that a message line terminal 309 is connected to the telephone set terminal 310 without causing the facsimile machine 308 to break the DC loop 2. The state can be determined as changeover of the communication path from a modem 325 to the telephone set upon generation of a telephone reservation.

However, in the telephone reservation mode, in order to determine whether a telephone set supposed to be connected to the telephone set terminal 310 is set in an off-hook state prior to a connection between the message line terminal 309 and the telephone set terminal 310, the facsimile machine 308 causes the DC power source circuit 328 to supply a current to the telephone set terminal 310. Therefore, the DC loop detection circuit 2 (318) detects the DC loop 2. I this manner, the DC loop detection circuit 2 (318) cannot discriminate the DC loop formed by connecting the message line terminal 309 and the telephone set terminal 310 from the DC loop formed by the DC power source circuit 328. Upon detection of the DC loop formed by the DC power source circuit 328, the message line is changed over from the facsimile machine 308 to a message circuit 312. The message line 303 is changed over prior to the end of communication procedures of the facsimile machine 308, thus causing a facsimile communication error.

Figure 14:
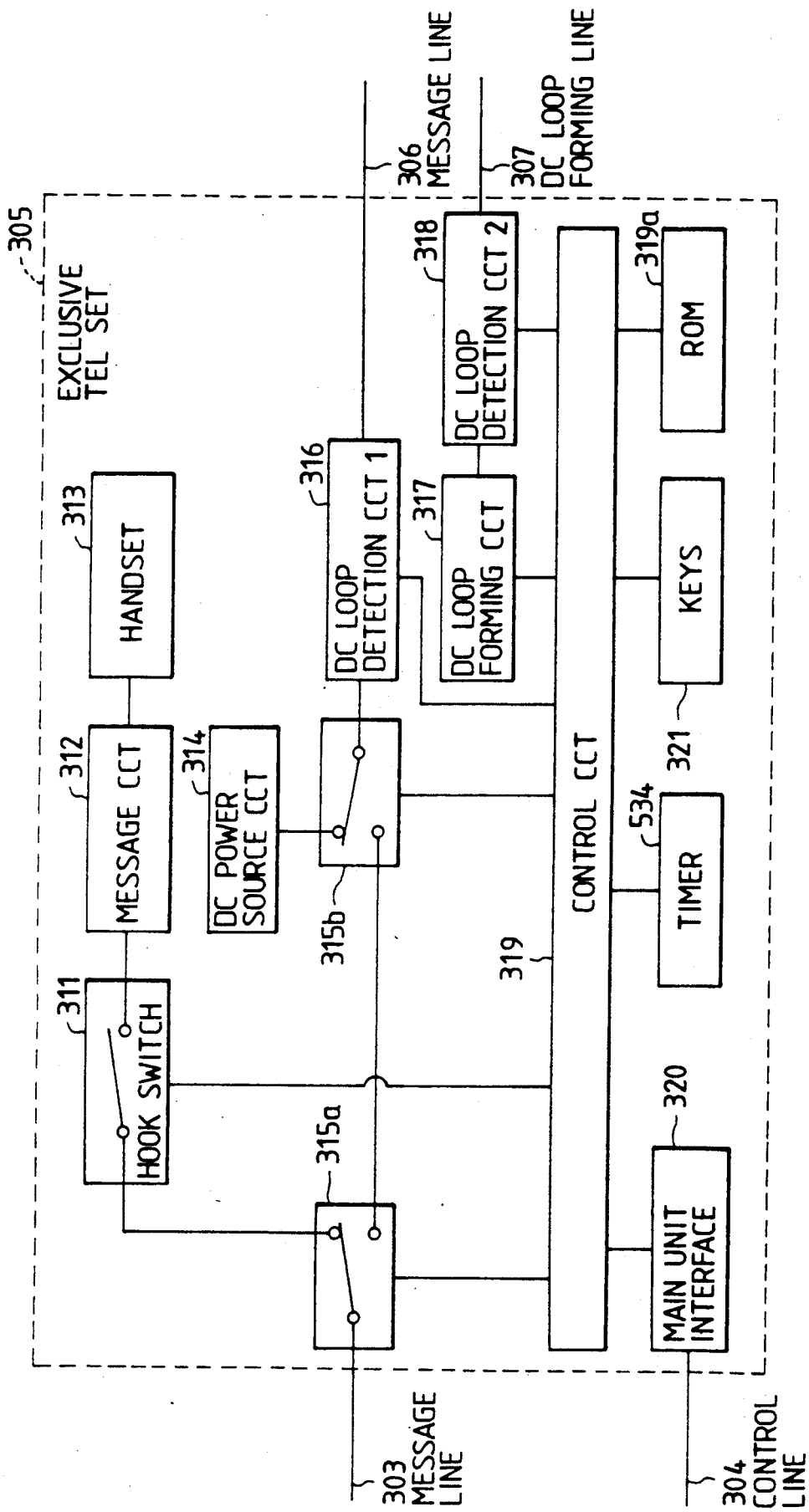
FIG. 14 is a block diagram of an exclusive telephone set according to a fifth embodiment of the present invention.

FIG. 14 shows an arrangement of the exclusive telephone set of the fifth embodiment. This arrangement is obtained by adding a timer 534 to the arrangement of the exclusive telephone set of the third embodiment shown in FIG. 9.

Figure 15:
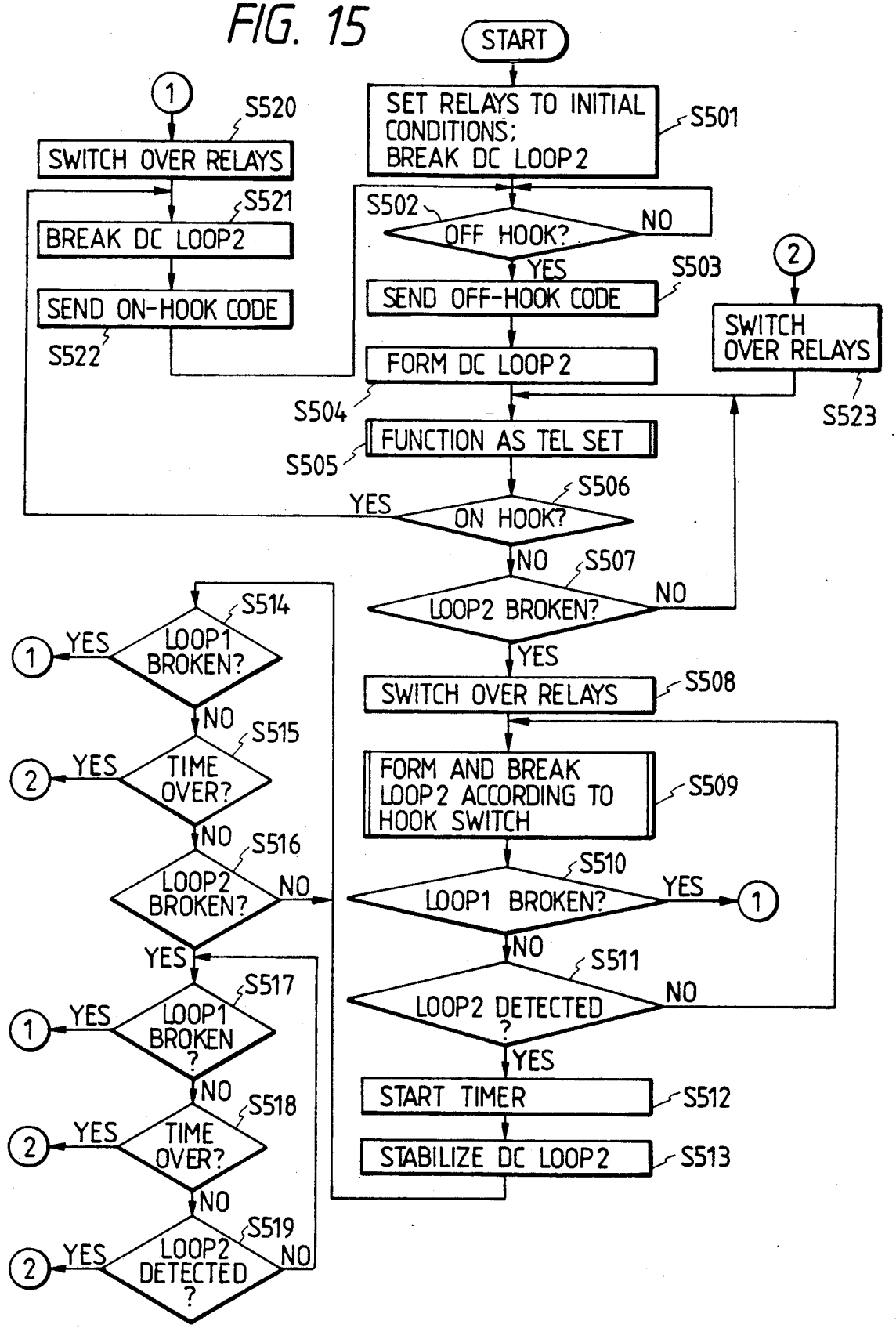
FIG. 15 is a flow chart showing control procedures of the exclusive telephone set of the fifth embodiment

FIG. 15 shows control procedures of the exclusive telephone set which can respond to a telephone reservation. The procedures in FIG. 15 are stored in a ROM 319a as a program of a control circuit 319.

In step S501 of FIG. 15, the control circuit 519 performs reset operations. The control circuit 319 changes over a relay 315a to a hook switch 311 and a relay 315b to a DC loop power source circuit 314. A DC loop 2 of a DC loop forming circuit 317 is broken.

In step S502, the control circuit 319 monitors the state of the hook switch 311. When an off-hook state is detected, the control circuit 319 sends an off-hook code to a main unit 302 in steps S503 and S504. The DC loop 2 is formed by the DC loop forming circuit 317. The flow advances to a loop of steps S505, S506, and S507.

In step S505, the control circuit 319 performs telephone function processing. When the control circuit 319 detects an on-hook state in step S506, the DC loop 2 of the DC loop forming circuit 317 is broken in step S521. The control circuit 319 sends an on-hook code to the main unit 302 in step S522, and the flow returns to step S502.

In step S506, when the off-state is kept unchanged, the control circuit 319 determines in step S507 whether a DC loop detection circuit 2 (318) detects the DC loop 2. If YES in step S507, the loop of steps S505, S506, and S507 is repeated.

The control circuit 319 determines in step S507 whether a relay 324a of a facsimile machine 308 is changed over to a modem 325, i.e., whether the facsimile machine 308 performs facsimile communication. When the facsimile machine 308 is not performing facsimile communication, a message line 306 is connected to the DC loop forming line 307. Therefore, the DC loop detection circuit 318 detects the DC loop 2.

When the relay 324a is changed over to the modem and facsimile communication is performed, the DC loop detection circuit 318 does not detect the DC loop 2. In this case, the control circuit 319 changes over the relays 315a and 315b in step S508 and connects the message line 303 to the facsimile machine 308. The flow advances to a loop of steps S509, S510, and S511. In step S509, breaking and formation of the DC loop 2 of the DC loop forming circuit 317 are synchronized with opening and closing of the hook switch 311. Therefore, the DC loop state of the telephone set terminal 310 upon an on-/off-hook operation of the exclusive telephone set 305 can be set to be the same as that upon an on-/off-hook operation of the two-wire telephone set shown in FIG. 2.

During facsimile communication, the loop of steps S509, S510, and S511 is repeated due to the following reason. During facsimile communication, the facsimile machine 308 causes the DC loop forming circuit 322 to form the DC loop 1, and the relay 324a is changed over to the modem. During facsimile communication, the facsimile machine 308 does not cause a DC power source circuit 328 to form a DC loop at the telephone set terminal 310. Therefore, the DC loop 1 is detected by the DC loop detection circuit 1 (316), but the DC loop detection circuit 2 (318) does not detect the DC loop 2.

There are two methods of ending facsimile communication. One method is to cause the facsimile machine 308 to break the line and to end facsimile communication. The other method is not to cause the facsimile machine 308 to break the line but to connect the line to the exclusive telephone set 305 to allow operator's message communication, i.e., response to the telephone reservation. In the former case, the facsimile machine 308 interrupts formation of a DC loop by the DC loop forming circuit 322 and breaks the line. When the DC loop detection circuit 1 (316) does not detect the DC loop 1, the control circuit can detect the end of facsimile communication. When the DC loop detection circuit 1 (316) does not detect the DC loop 1 in step S510, the two relays 315a and 315b are changed over in step S520, and the message line 303 is connected to the hook switch 311. The operations in steps S321 and 322 are performed, and monitoring of the hook switch 311 is restored.

In the latter case, the facsimile machie 308 continuously generates the ringing tone from the speaker 333 and changes over the relay 324b to the DC power source circuit 328 without breaking the DC loop 1. The DC loop detection circuit 331 monitors in step S511 whether the DC loop is formed on the DC loop forming line 307, i.e., the handset 313 is set in the off-hook state. When the exclusive telephone set 305 detects that the operator sets the handset 313 in the off-hook state in response to the ringing tone of the facsimile machine 308, the DC loop forming circuit 317 forms a DC loop. In this case, the DC loop 2 is detected by the DC loop detection circuit 2 (318). The DC loop detection circuit 1 (316) keeps detecting the DC loop 1, as a matter of course. When the DC loop detection circuit 2 (318) detects the DC loop 2 in step S511, the control circuit 319 causes the timer 534 to start in step S512. In addition, formation of the DC loop by the DC loop forming circuit 317 is fixed in step S513, and the flow advances to a loop of steps S514, S515, and S516 regardless of the operating state of the hook switch 311 so as to prevent an erroneous operation of the DC loop detection circuit 2 (318) by disconnection of the hook switch 311 or the like.

When an off-hook state of the exclusive telephone set 305 is detected, the facsimile machine 308 causes the DC loop detection circuit 331 to detect the DC loop. Therefore, the control circuit 327 detects the off-hook state of the handset 313 and causes the DC power source circuit 328 to supply a current. The control circuit 327 then sends a facsimile communication command representing an operator's response to the facsimile machine at the other end of the line. Thereafter, the control circuit 319 changes over the relays 324a and 324b to connect the message line 306 to the DC loop forming line 307. The DC loop detection circuit 2 (318) of the exclusive telephone set 305 detects breaking of the DC loop 2 once when the DC power source circuit 328 in the facsimile machine is disabled. Thereafter, the DC loop detection circuit 2 (318) detects the DC loop 2 again upon changeover of the relays 324a and 324b. In a loop of steps S514, S515, and S516, when the DC loop detection circuit 2 (318) detects breaking of the DC loop 2 in step S516 upon deenergization of the DC power source circuit 328, the flow advances to a loop of steps S517, S518, and S519. When the DC loop detection circuit 2 (318) detects the DC loop again upon changeover of the relays 324a and 324b in step S519, the control circuit 319 changes over the relays 315a and 315b in step S523 and allows message communication with the handset 313. Thereafter, the flow advances to a message communication loop of the exclusive telephone set 305 in steps S505, S506, and S507.

Monitoring of the DC loop detection circuit 1 (316) is performed to determine breaking of the facsimile line by abrupt power-off of the facsimile machine. If the line is disconnected, operations in steps S520, S521, and S522 are performed, and the flow returns to monitoring of the hook switch 311 in step S502. The timer 534 started in step S512 is monitored in steps S515 and S518. If time-out is detected, the control circuit 319 changes over the relays 315a and 315b in step S523, and the flow returns to the message communication loop of steps S505, S506, and S507. A sufficient time required for the time-out operation must be set in the timer 534 so as not to interrupt the facsimile communication procedures and to transmit a command representing an operator's response from the facsimile machine 308 to the facsimile machine at the other end of the line. In particular, when the facsimile machine 308 changes over the relays 324a and 324b without turning off the DC power source circuit 328, the loop of steps S514, S515, and S516 in the control procedures of FIG. 15 is repeated, thus effectively utilizing the time-out mechanism.

The above embodiment exemplifies a facsimile machine as a data communication terminal. However, a teletex, a wordprocessor (with a communication function), or a personal computer may be used in place of the facsimile machine.

According to this embodiment as described above, when the DC loop detection circuit 2 (318) detects the DC loop 2, does not detect the DC loop 2, and detects the DC loop 2 again, the message line 303 is changed over to the message circuit 312. When a predetermined period of time has elapsed after the DC loop is detected by the DC loop detection circuit 2 (318) for the first time while the DC loop detection circuit 1 (316) detects the DC loop 1, the message line 303 is changed over to the message circuit 312. In either arrangement, after the data communication procedures are completed, the message line can be changed over from the data communication terminal to the message circuit 312, so that the telephone set can respond to the telephone reservation without causing a data communication error.

The present invention has been described with preferred embodiments. However, the present invention is not limited to the arrangement described above. Various changes and modifications may be made within the scope of the appended claims.

What is claimed is:

1. A key telephone system comprising:
  (A) a main unit for controlling extension telephones; and
  (B) an extension telephone comprising:
    (b1) connecting means for connecting a data communications apparatus through a connection line,
    (b2) message communication means for performing message communication,
    (b3) generating means for, at arrival of a call, generating a calling signal to the data communication apparatus on the basis of a first command from said main unit, and
    (b4) sending means for sending a predetermined code signal to said main unit on the basis of a response to the call, from said message communication means or the data communication apparatus,
  wherein said main unit sends a second command to said extension telephone on the basis of a response to the call, from another extension telephone, and said generating means stops generating the calling signal on the basis of the second command.

2. A system according to claim 1, wherein said connecting means is capable of connecting a facsimile machine.

3. A system according to claim 1, wherein said connecting means connects said message communication means or said data communication apparatus to the main unit selectively.

4. A system according to claim 1, wherein said generating means generates the calling signal when a predetermined period of time has elapsed upon detection of the first command.

5. An apparatus according to claim 1, wherein said connecting means connects said main unit and said data communication apparatus when the data communication apparatus responds to the calling signal, and connects said main unit and said message communication means when said message communication means responds to the first command.

6. A system according to claim 1, wherein said generating means interrupts the generation of the calling signal when said message communication means responds during the generation of the calling signal by said generating means.

7. A system according to claim 1, wherein said control means receives the incoming command through a control line.

8. A system according to claim 1, wherein said message communication means comprises a handset, and said sending means recognizes an off-hook of said handset as a response from said message communication means.

9. A system according to claim 1, wherein said message communication apparatus is a key telephone.

10. A system according to claim 1, wherein said main unit sends the first command when a call arrives on an outside line.

11. A system according to claim 1, wherein said sending means recognizes a response from the communication apparatus on the basis of the detection of breaking of a loop formed on the connection line.

12. A system according to claim 1, wherein said generating means generates the calling signal to the data communication apparatus through the connection line, and the data communication apparatus performs data communication through the connection line.

13. A message communication apparatus comprising:
connecting means for connecting a data communications apparatus through a connection line;
message communication means for performing message communication through a communication line, said message communication means comprising a handset and a hook switch;
forming means for forming a loop on said connection line when said hook switch is in an off-hook state;
detecting means for detecting breaking of the loop by the data communication apparatus; and
control means for controlling said connecting means to connect said data communication apparatus to the communication line in accordance with the detection of the breaking of the loop by said detecting means.

14. An apparatus according to claim 13, wherein said message communication apparatus comprises means for sending to a main unit a code representing that said hook switch is in an off-hook state.

15. An apparatus according to claim 13, wherein said connecting means connects said message communication means or said data communication apparatus to a communication line.

16. An apparatus according to claim 13, wherein said connecting means is capable of connecting a facsimile apparatus as said data communication apparatus.

17. An apparatus according to claim 13, wherein said connecting means connects a data communication terminal of said data communication apparatus and a message communication apparatus connecting terminal of said data communication apparatus through respective first and second connection lines.

18. An apparatus according to claim 17, wherein said forming means forms a loop on a connection line to the message communication apparatus connecting terminal of said data communication apparatus.

19. An apparatus according to claim 17, wherein said connecting means connects the data communication terminal of said data communication apparatus to the communication line.

20. An apparatus according to claim 13, wherein said message communication apparatus is a key telephone.

21. A message communication apparatus comprising:
connecting means for connecting a data communications terminal of a data communication apparatus and a message communication apparatus connecting terminal of the data communication apparatus through respective first and second connection lines;
message communication means for performing message communication through a communication line;
request means for requesting execution of the message communication by said message communication means; and
forming means for forming a loop on said second connection line in accordance with a request of said request means.

22. An apparatus according to claim 21, wherein said request means includes a hook switch.

23. An apparatus according to claim 22, wherein said forming means forms the loop on the second connection line when said hook switch is in an off-hook state.

24. An apparatus according to claim 21, wherein said connecting means is capable of connecting a facsimile apparatus as said data communication apparatus.

25. An apparatus according to claim 21, wherein said message communication means performs message communication without using the first or the second connecting line.

26. A message communication apparatus comprising:
connecting means for connecting a data communication terminal of a data communication apparatus and a message communication connecting terminal of the data communication apparatus through respective first and second connection lines;
message communicating means for performing message communication through a communication line;
detecting means for detecting the formation of a loop on the second connection line; and
switching means for connecting one of said first connection line and the message communicating means to the communication line, wherein said switching means switches the first connection line to connect the communication line to said message communicating means in accordance with the detection of said detecting means.

27. An apparatus according to claim 26, wherein said switching means switches the first connection line when the loop on the second connection line is formed without breaking a loop formed on the first connection line.

28. An apparatus according to claim 26, wherein said switching means switches the first connection line to connect to the communication line after a predetermined communication procedure has been performed by the data communication apparatus.

29. An apparatus according to claim 26, wherein said connecting means is capable of connecting a facsimile apparatus as said data communication apparatus.

30. An apparatus according to claim 26, wherein said message communication means comprises forming means for forming a loop on the second connection line during execution of the message communication.

31. An apparatus according to claim 26, further comprising second detecting means for detecting breaking of a loop on the first connecting line, and said switch means switches the first connection line to connect the communication line to said message communicating means.

32. A key telephone system comprising:
a plurality of message communication apparatuses;
a main unit for sending an incoming command to said plurality of message communication apparatuses upon reception of an incoming call;

a data communication apparatus connected to one of said plurality of message communication apparatuses; and control means for connecting said data communication apparatus to a line corresponding to the incoming call when none of said plurality of message communication apparatuses responds to the incoming command.

33. A system according to claim 32, wherein said control means sends out a calling signal to said data communication apparatus and connects said data communication apparatus to the line corresponding to the incoming call when said data communication apparatus responds to the calling signal.

34. A system according to claim 33, wherein said control means sends out the calling signal when a predetermined period of time has elapsed upon reception of the incoming call.

35. A system according to claim 32, wherein at least one of said message communication apparatuses is capable of connecting a facsimile apparatus as said data communication apparatus.

36. A system according to claim 32, wherein said control means connects said data communication apparatus to the line corresponding to the incoming call when none of said plurality of message communication apparatuses responds to the incoming command within the predetermined period of time upon reception of the incoming call.

37. A system according to claim 32, wherein said one message communication apparatus connected to said data communication apparatus comprises said control means.

38. A system according to claim 32, wherein said control means connects said data communication apparatus to the line corresponding to the incoming command when message communication apparatus did not respond to the incoming command within the predetermined period of time upon reception of the incoming command.

39. A system according to claim 32, wherein at least one of said message communication apparatuses connected to said data communication apparatus comprises said control means.

40. A key telephone system comprising:
connecting means for connecting a data communication terminal of a data communication apparatus and a message communication connecting terminal of the data communication apparatus through respective first and second connection lines;
message communication apparatus comprising message communication means;
a main unit for controlling said data communication apparatus;
detecting means for detecting formation of a loop on the second connecting line; and
changeover means for connecting one of said data communication apparatus and said message communication means to the main unit, wherein said changeover means switches said data communication apparatus to connect the main unit to the message communication means in accordance with the detection by said detecting means.

41. A system according to claim 40, wherein said changeover means switches the data communication apparatus when a loop on the second connection line is formed without breaking a loop formed on the first connection line.

42. A system according to claim 40, wherein said changeover means switches the the data communication apparatus when a predetermined communication procedure has been performed by the data communication apparatus.

43. A system according to claim 40, wherein said message communication apparatus is capable of connecting a facsimile apparatus as the data communication apparatus.

44. A system according to claim 40, wherein said connecting means is included in said message communication apparatus.

45. A system according to claim 40, wherein said message communication means comprises forming means for forming a loop on the second connection line during execution of the message communication.

46. A system according to claim 40, wherein said detecting means is included in said message communication apparatus.

47. A system according to claim 40, wherein said changeover means is included in said message communication apparatus.

48. An apparatus according to claim 40, further comprising second detecting means for detecting breaking of a loop on the first connecting line, and said switch means switches the first connection line to connect the communication line to said message communicating means.

49. A system according to claim 40, wherein said second detecting means is included in said message communication apparatus.

50. An apparatus according to claim 21, wherein said message communication apparatus is a key telephone.

51. An apparatus according to claim 26, wherein said message communication apparatus is a key telephone.

* * * * *

UNITED STATES PATENT AND TRADEMARK OFFICE
CERTIFICATE OF CORRECTION

PATENT NO. : 5,142,567

DATED : August 25, 1992

INVENTOR(S) : MITSUHIRO WATANABE

It is certified that error appears in the above-identified patent and that said Letters Patent is hereby corrected as shown below:

IN [56] REFERENCES CITED

Under U.S. PATENT DOCUMENTS, "Yoshide" should read --Yoshida--.

COLUMN 2

Line 6, "being" should read --connected through--.
Line 35, "being" should read --connected through--.

COLUMN 3

Line 68, "invention" should read --invention.--.

COLUMN 4

Line 40, "control circuit 121" should read --control circuit 121.--.

COLUMN 5

Line 8, "communication" should read --communication.--.
Line 11, "keys" should read --keys.--.
Line 25, "connectors" should read --connectors.--.
Line 27, "keys 129" should read --keys 129.--.
Line 29, "operations" should read --operations.--.
Line 51, "received" should read --received.--.

COLUMN 6

Line 14, "tone" should read --tone.--.
Line 31, "S106" should read --S106.--.
Line 45, "operation" should read --operation.--.

UNITED STATES PATENT AND TRADEMARK OFFICE
CERTIFICATE OF CORRECTION

PATENT NO. : 5,142,567

DATED : August 25, 1992

INVENTOR(S) : MITSUHIRO WATANABE

It is certified that error appears in the above-identified patent and that said Letters Patent is hereby corrected as shown below:

COLUMN 7

Line 12, "time" should read --time.--.
Line 14, "107" should read --107.--.

COLUMN 9

Line 42, "319" should read --319.--.

COLUMN 11

Line 2, "communication" should read --communication.--.

COLUMN 13

Line 5, "308" should read --308.--.
Line 20, "314" should read --314.--.
Line 23, "detection" should read --detection.--.

COLUMN 15

Line 26, "I" should read --In--.

COLUMN 16

Line 57, "facsimile machie 308" should read --facsimile machine 308--.

COLUMN 18

Line 27, "nications" should read --nication--.

UNITED STATES PATENT AND TRADEMARK OFFICE
CERTIFICATE OF CORRECTION

PATENT NO. : 5,142,567

DATED : August 25, 1992

INVENTOR(S) : MITSUHIRO WATANABE

It is certified that error appears in the above-identified patent and that said Letters Patent is hereby corrected as shown below:

COLUMN 19

Line 22, "tions" should read --tion--.

COLUMN 20

Line 3, "communication" should read --communicating--.

Signed and Sealed this

Twenty-eighth Day of December, 1993

Attest:

BRUCE LEHMAN

Attesting Officer

Commissioner of Patents and Trademarks